US012095150B2

(12) United States Patent
Ryu et al.

(10) Patent No.: US 12,095,150 B2
(45) Date of Patent: Sep. 17, 2024

(54) BROADBAND ANTENNA MOUNTED ON VEHICLE

(71) Applicant: LG ELECTRONICS INC., Seoul (KR)

(72) Inventors: Seungwoo Ryu, Seoul (KR); Joohee Lee, Seoul (KR); Junyoung Jung, Seoul (KR); Hyungjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 17/761,539

(22) PCT Filed: Sep. 19, 2019

(86) PCT No.: PCT/KR2019/012109
§ 371 (c)(1),
(2) Date: Mar. 17, 2022

(87) PCT Pub. No.: WO2021/054494
PCT Pub. Date: Mar. 25, 2021

(65) Prior Publication Data
US 2022/0368009 A1 Nov. 17, 2022

(51) Int. Cl.
*H01Q 1/32* (2006.01)
*H01Q 1/36* (2006.01)
(Continued)

(52) U.S. Cl.
CPC ............. *H01Q 1/3275* (2013.01); *H01Q 1/36* (2013.01); *H01Q 5/321* (2015.01); *H01Q 21/061* (2013.01)

(58) Field of Classification Search
CPC ........ H01Q 1/3275; H01Q 1/36; H01Q 5/321; H01Q 21/061; H01Q 1/523; H01Q 5/40; H01Q 21/28
See application file for complete search history.

(56) References Cited

U.S. PATENT DOCUMENTS 3,818,490 A * 6/1974 Leahy .................... H01Q 21/24
343/846
4,225,869 A * 9/1980 Lohrmann ............. H01Q 21/08
343/773
(Continued)

FOREIGN PATENT DOCUMENTS

KR 20120094934 8/2012
KR 20150022795 3/2015
(Continued)

OTHER PUBLICATIONS

PCT International Application No. PCT/KR2019/012109, International Search Report dated Jun. 18, 2020, 4 pages.

*Primary Examiner* — Hai V Tran
*Assistant Examiner* — Bamidele A Immanuel
(74) *Attorney, Agent, or Firm* — LEE, HONG, DEGERMAN, KANG & WAIMEY

(57) ABSTRACT

A vehicle provided with an antenna according to the present invention comprises: a conical array antenna in which cone radiators are arranged at certain intervals, wherein the cone radiators are provided between a first substrate and a second substrate and have upper portions connected to the first substrate, lower portions connected to the second substrate, and openings at the upper portions thereof; a patch array radiator which is formed on the first substrate and in which metal patches formed to be separated from the top openings are arranged; shorting pins formed so as to electrically connect the metal patches and a ground layer of the second substrate; and a transceiver circuit for controlling a signal to be radiated through at least one of the conical array antennas, thereby improving a signal reception performance in almost any direction of the vehicle.

20 Claims, 18 Drawing Sheets

(51) Int. Cl.
*H01Q 5/321* (2015.01)
*H01Q 21/06* (2006.01)

(56) References Cited

U.S. PATENT DOCUMENTS

| | | | | | |
|---|---|---|---|---|---|
| 5,010,349 | A * | 4/1991 | Mizuno | H01Q 1/36 343/700 MS |
| 5,909,191 | A * | 6/1999 | Hirshfield | H01Q 3/267 342/174 |
| 6,697,019 | B1 * | 2/2004 | Hyuk-Joon | H01Q 1/3275 343/729 |
| 6,839,039 | B2 * | 1/2005 | Tanaka | H01Q 21/065 343/757 |
| 8,228,257 | B2 * | 7/2012 | Lalezari | H01Q 9/28 343/893 |
| 9,614,273 | B1 * | 4/2017 | Sena | H01Q 1/36 |
| 2003/0103008 | A1 * | 6/2003 | Petropoulos | H01Q 1/243 343/702 |
| 2003/0201939 | A1 * | 10/2003 | Reece | H01Q 21/24 343/700 MS |
| 2005/0200531 | A1 * | 9/2005 | Huang | H01Q 19/026 343/893 |
| 2006/0055605 | A1 * | 3/2006 | Peled | H01Q 1/245 343/702 |
| 2008/0111755 | A1 * | 5/2008 | Haziza | H01Q 13/00 343/786 |
| 2008/0117113 | A1 * | 5/2008 | Haziza | H01Q 13/0233 343/786 |
| 2008/0117114 | A1 * | 5/2008 | Haziza | H01Q 13/00 343/786 |
| 2008/0297430 | A1 * | 12/2008 | Schano | H01Q 9/42 343/860 |
| 2009/0289865 | A1 * | 11/2009 | Parsche | H01Q 9/36 343/772 |
| 2010/0053006 | A1 * | 3/2010 | Miyoshi | H01Q 9/27 343/742 |
| 2010/0085264 | A1 * | 4/2010 | Du | H01Q 9/40 343/772 |
| 2010/0149061 | A1 * | 6/2010 | Haziza | H01Q 13/0233 343/781 R |
| 2011/0279342 | A1 * | 11/2011 | Takahashi | H01Q 9/40 343/845 |
| 2012/0306710 | A1 * | 12/2012 | Mishan | H01Q 3/26 343/784 |
| 2015/0015447 | A1 * | 1/2015 | Yona | H01Q 9/40 343/786 |
| 2015/0070234 | A1 * | 3/2015 | Jones | H01Q 21/28 343/797 |
| 2015/0357720 | A1 * | 12/2015 | Chen | H01Q 21/28 343/727 |
| 2017/0352961 | A1 * | 12/2017 | Morrison | H01Q 9/16 |
| 2018/0053993 | A1 * | 2/2018 | Jamaly | H01Q 9/40 |
| 2018/0248272 | A1 * | 8/2018 | Prinsloo | H01Q 5/48 |
| 2019/0123441 | A1 * | 4/2019 | Sudo | H01Q 1/243 |
| 2019/0165473 | A1 * | 5/2019 | Yun | H01Q 21/062 |
| 2019/0260107 | A1 * | 8/2019 | Baur | H01Q 13/02 |
| 2021/0013597 | A1 * | 1/2021 | Jamaly | H01Q 21/24 |
| 2021/0143533 | A1 * | 5/2021 | Nagaishi | H01Q 1/422 |
| 2022/0200139 | A1 * | 6/2022 | Ryu | H01Q 1/243 |
| 2022/0209400 | A1 * | 6/2022 | Ryu | H01Q 9/045 |
| 2022/0216602 | A1 * | 7/2022 | Ryu | H01Q 21/28 |
| 2022/0255213 | A1 * | 8/2022 | Ryu | H01Q 5/20 |

FOREIGN PATENT DOCUMENTS

| | | |
|---|---|---|
| KR | 20180044864 | 5/2018 |
| WO | 2015189471 | 12/2015 |

* cited by examiner (a)

(b)

BROADBAND ANTENNA MOUNTED ON VEHICLE

CROSS-REFERENCE TO RELATED APPLICATIONS

This application is the National Stage filing under 35 U.S.C. 371 of International Application No. PCT/KR2019/012109, filed on Sep. 19, 2019, the contents of which are all incorporated by reference herein in its entirety.

TECHNICAL FIELD

This specification relates to a broadband (or wideband) antenna mounted on a vehicle. One particular implementation relates to a vehicle or electronic device having a cone antenna operating in the range from a low frequency band to a 5 GHz band.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange cone antennas having such a three-dimensional structure in an electronic device or vehicle while maintaining a low interference level among the cone antennas.

DISCLOSURE OF INVENTION

Technical Problem

The present disclosure is directed to solving the aforementioned problems and other drawbacks. The present disclosure describes an antenna system having broadband antenna elements operating in the range from a low frequency band to a 5 GHz band.

The present disclosure also describes a vehicle having a plurality of antenna elements operating in the range from a low frequency band to a 5 GHz band.

The present disclosure further describes an antenna structure capable of improving isolation among a plurality of antenna elements operating in the range from a low frequency band to a 5 GHz band.

Solution to Problem

In order to achieve those aspects and other advantages of the subject matter disclosed herein, there is provided a vehicle having antennas. The vehicle may include a conical array antenna including cone radiators arranged at predetermined distances, the cone radiators being disposed between a first substrate and a second substrate, having an upper portion connected to the first substrate and a lower portion connected to the second substrate, and provided with upper apertures, respectively, a patch array radiator disposed on the first substrate and having metal patches disposed with being spaced apart from the upper apertures, shorting pins configured to electrically connect the metal patches and a ground layer of the second substrate, and a transceiver circuit configured to control a signal to be radiated through at least one of the conical array antennas, thereby improving a signal reception performance in almost all directions of the vehicle.

In one implementation, the conical array antenna may be configured as 2×2 conical array antennas spaced apart from each other by a predetermined distance in horizontal and vertical directions, and the transceiver circuit may perform Multi-input/Multi-output (MIMO) in a first frequency band through the 2×2 conical array antennas.

In one implementation, the 2×2 conical array antennas may include first to fourth cone radiators, and the patch array radiator may include 2×2 metal patches spaced apart from upper apertures of the first to fourth cone radiators.

In one implementation, the vehicle may further include a second type cone antenna arranged to be spaced apart from the conical array antenna by a predetermined distance and configured to operate in a second frequency band lower than a frequency band of the conical array antenna.

In one implementation, the second type cone antenna may include a second type cone radiator disposed between the first substrate and the second substrate, and having an upper portion connected to the first substrate and a lower portion connected to the second substrate, the second type cone radiator having a second upper aperture, and a second metal patch disposed to be spaced apart from the second upper aperture.

In one implementation, the second type cone antenna may include a second type cone radiator disposed between a third substrate and a fourth substrate spaced apart from the third substrate by a predetermined distance, and having an upper portion connected to the third substrate and a lower portion connected to the fourth substrate, the second type cone radiator having a second upper aperture, and a second metal patch disposed to be spaced apart from the second upper aperture.

In one implementation, the second type cone antenna may be configured as 2×2 array antennas by 1×2 array antennas disposed at one side of the conical array antenna and 1×2 array antennas disposed at another side of the conical array antenna. A distance between the 1×2 array antennas disposed at the one side and the 1×2 array antennas disposed at the another side may be longer than a distance between the conical array antennas.

In one implementation, the transceiver circuit may perform MIMO in a first frequency band through the conical array antennas, and perform MIMO in a second frequency band lower than the first frequency band through the second type cone antenna.

In one implementation, the vehicle may further include a second conical array antenna disposed between the conical array antenna and the 1×2 array antennas disposed at the another side, and configured to operate in a first frequency band.

In one implementation, the transceiver circuit may perform MIMO in the first frequency band through at least one of the conical array antennas and at least one of the second conical array antennas.

In one implementation, the second type cone antenna may include a first antenna module including first and second cone antennas disposed vertically at one side of the conical array antenna, and a second antenna module including third and fourth cone antennas disposed vertically at another side of the second conical array antenna. The second type cone antenna may operate in the second frequency band that is lower than the first frequency band.

In one implementation, the transceiver circuit may perform MIMO through one of the first and second cone antennas and one of the third and fourth cone antennas.

In one implementation, the vehicle may further include feeders disposed on the second substrate and configured to transmit signals to the cone radiators, respectively, through lower apertures of the cone radiators of the conical array antenna.

In one implementation, the first and second antenna modules may include remote keyless entry (RKE) antennas therein. The first and second antenna modules may include antennas operating in Bluetooth and Wi-Fi bands.

In one implementation, the vehicle may further include a Digital Satellite Dual Antenna (DSDA) disposed between the conical array antenna and the second conical array antenna and configured to receive a satellite signal.

In order to achieve those aspects and other advantages of the subject matter disclosed herein, there is provided an antenna system mounted on a vehicle. The antenna system may include a conical array antenna including cone radiators arranged at predetermined distances, the cone radiators being disposed between a first substrate and a second substrate, having an upper portion connected to the first substrate and a lower portion connected to the second substrate, and provided with upper apertures, a patch array radiator disposed on the first substrate and having metal patches disposed with being spaced apart from the upper apertures, shorting pins configured to electrically connect the metal patches and a ground layer of the second substrate, and feeders disposed on the second substrate and configured to transmit signals to the cone radiators, respectively, through lower apertures of the cone radiators of the conical array antenna.

In one implementation, the shorting pins may be disposed at the cone radiators to match each other, so as to connect the metal patches and the ground layer.

In one implementation, the conical array antenna may be configured as 2×2 conical array antennas spaced apart from each other by predetermined distances in horizontal and vertical directions, and the antenna system may further include a transceiver circuit configured to perform MIMO in a first frequency band through the 2×2 conical array antennas.

In one implementation, the antenna system may further include a second type cone antenna arranged to be spaced apart from the conical array antenna by a predetermined distance and configured to operate in a second frequency band lower than a frequency band of the conical array antenna.

In one implementation, the antenna system may further include a baseband processor connected to the transceiver circuit and configured to control the transceiver circuit. The baseband processor may perform MIMO or a diversity operation through the 2×2 conical array antennas and a second conical array antenna spaced apart from the 2×2 conical array antennas in the first frequency band, and perform the MIMO and the diversity operation through second type cone antennas disposed at left and right sides of the 2×2 conical array antennas in a second frequency band lower than the first frequency band.

Advantageous Effects of Invention

Technical effects of the vehicle and antenna system having the cone antennas will be described as follows.

According to the present disclosure, hollow cone antennas can be disposed in the vehicle so as to reduce a weight of the antenna system mounted on the vehicle.

According to the present disclosure, the cone antenna can be connected to a metal patch adjacent thereto by a single shorting pin, thereby improving a signal reception performance in almost all directions.

According to the present disclosure, the antenna system can be optimized with different antennas in the low band LB and other bands. This can result in arranging the antenna system with optimal configuration and performance on a roof frame of the vehicle.

According to the present disclosure, the antenna system of the vehicle can implement the MIMO and the diversity operation using a plurality of antennas in specific bands.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
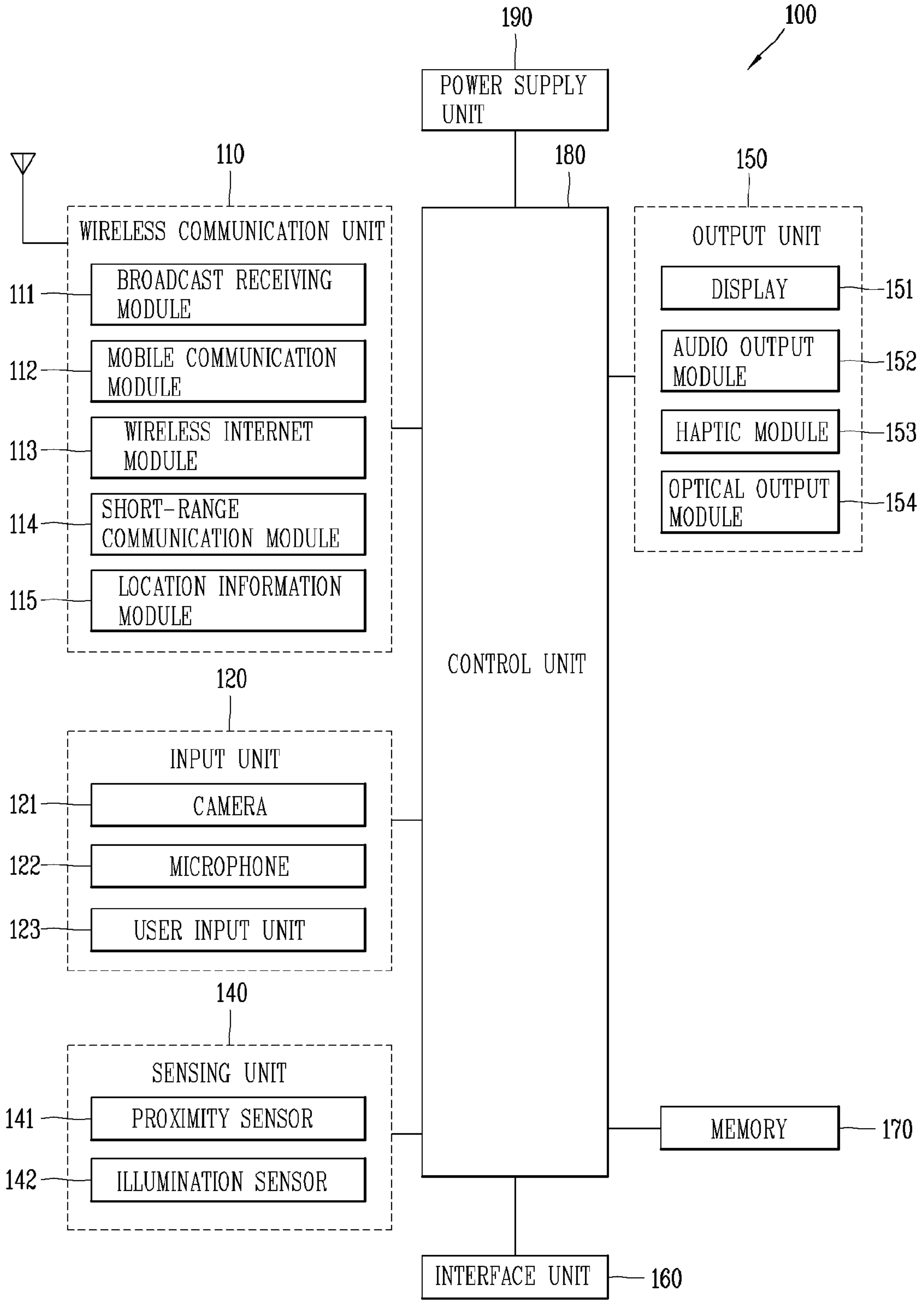
FIG. 1A is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

On the other hand, an antenna system mounted on a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Figure 2A:
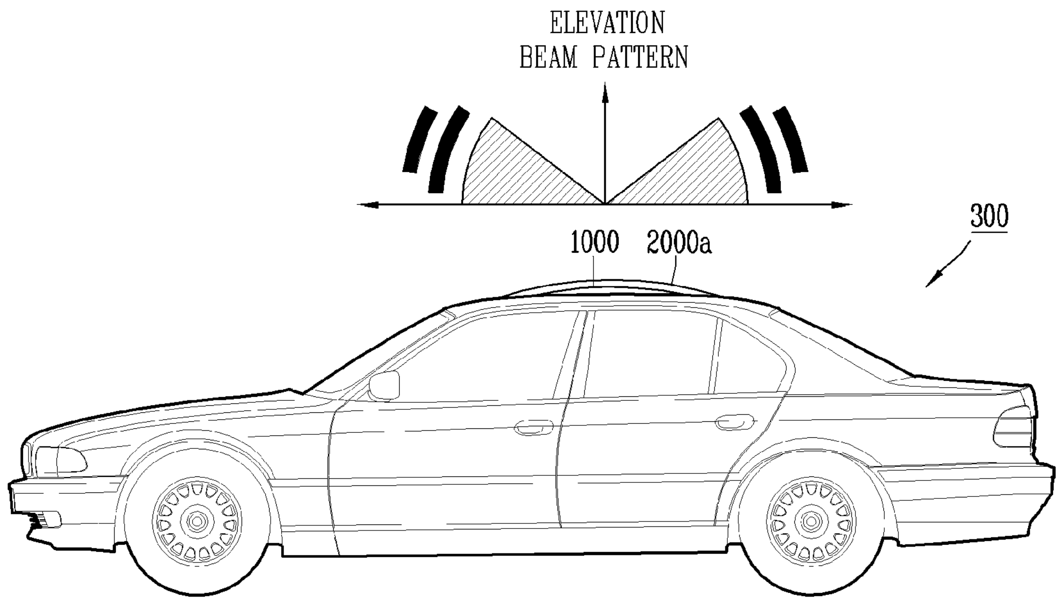
FIGS. 2A to 2C are views illustrating an example of a structure for mounting an antenna system in a vehicle, which includes the antenna system mounted on the vehicle.
Figure 2B:
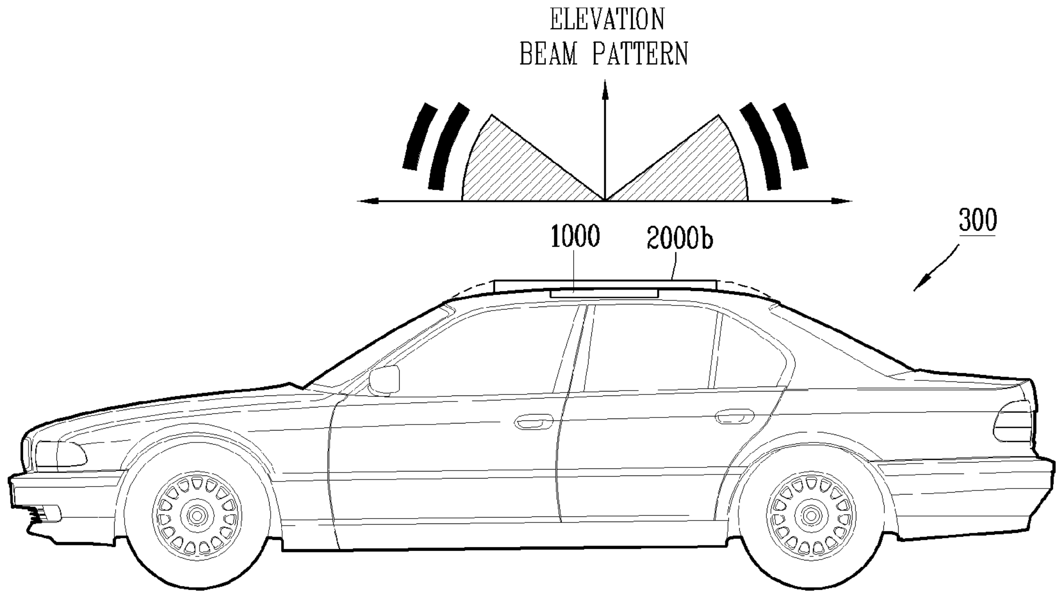
Figure 2C:
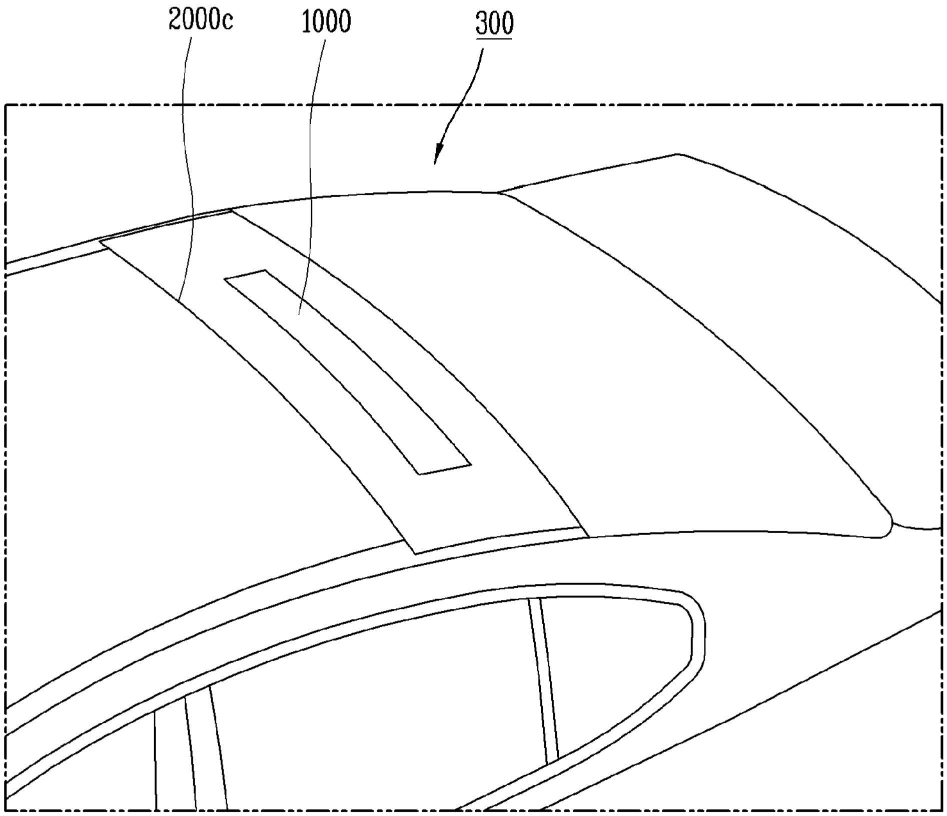

FIGS. 2A to 2C are views illustrating an example of a structure for mounting an antenna system on a vehicle, which includes the antenna system mounted on the vehicle. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted on a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to 2B, the antenna system 1000 may be disposed within a roof structure 2000*b* of the vehicle, and at least part of the roof structure 2000*b* may be made of a non-metallic material. At this time, the at least part of the roof structure 2000*b* of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000*c* of the vehicle, and at least part of the roof frame 200*c* may be made of a non-metallic material. At this time, the at least part of the roof frame 2000*c* of the vehicle may be realized as the non-metallic material, and may be made of a dielectric material through which radio signals are transmitted/received between the antenna system 1000 and the base station.

Figure 3:
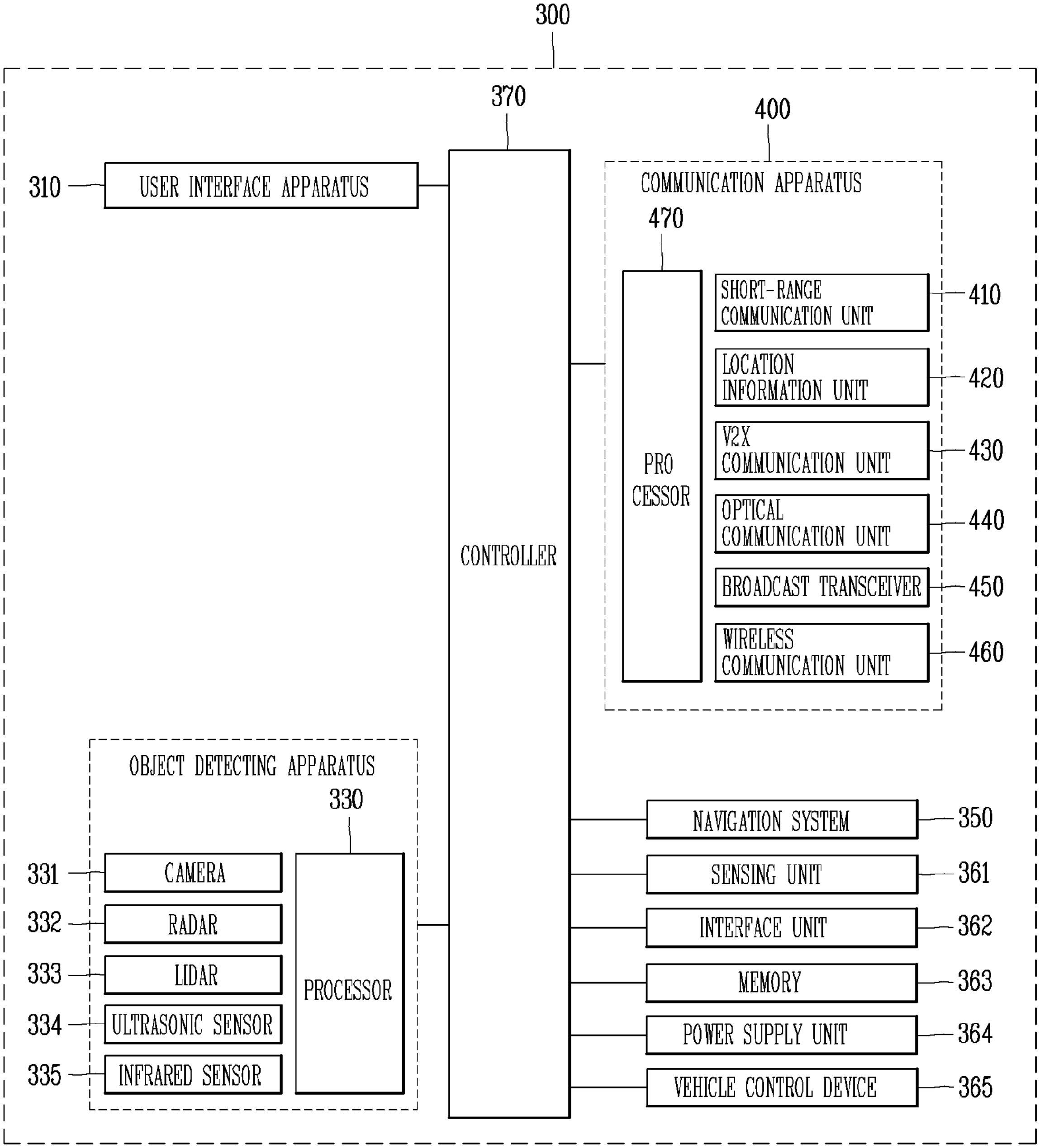
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIGS. 2 and 3, a vehicle 300 may include wheels turning by a driving force, and a steering apparatus 510 for adjusting a driving (ongoing, moving) direction of the vehicle 300.

The vehicle 300 may be an autonomous vehicle. The vehicle 300 may be switched into an autonomous (driving) mode or a manual (driving) mode based on a user input. For example, the vehicle 300 may be switched from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous mode into the manual mode based on driving environment information generated in the object detecting apparatus 320.

In an example, the vehicle 300 may be switched from the manual mode into the autonomous mode or from the autonomous mode into the manual mode based on driving environment information received through a communication apparatus 400. The vehicle 300 may be switched from the manual mode into the autonomous mode or from the autonomous mode into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 2, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 310 may implement user interfaces (UIs) or user experiences (UXs) through the user interface apparatus 200.

The object detecting apparatus 320 may be an apparatus for detecting an object located at outside of the vehicle 300. The object may be a variety of objects associated with driving (operation) of the vehicle 300. In some examples, objects may be classified into moving objects and fixed (stationary) objects. For example, the moving objects may include other vehicles and pedestrians. The fixed objects may include traffic signals, roads, and structures, for example.

The object detecting apparatus 320 may include a camera 321, a radar 322, a LiDAR 323, an ultrasonic sensor 324, an infrared sensor 325, and a processor 330.

According to an implementation, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an embodiment, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus 320 and/or a V2X communication unit 430. In some examples, guidance information, autonomous driving service, etc. may be provided based on V2V, V2I, and V2X information obtained through a wireless communication unit operating together with the antenna system 1000.

The object detecting apparatus 320 may operate according to the control of a controller 370.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a 4G wireless communication module 450, and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 is a unit for performing wireless communication with a server (Vehicle to Infra; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
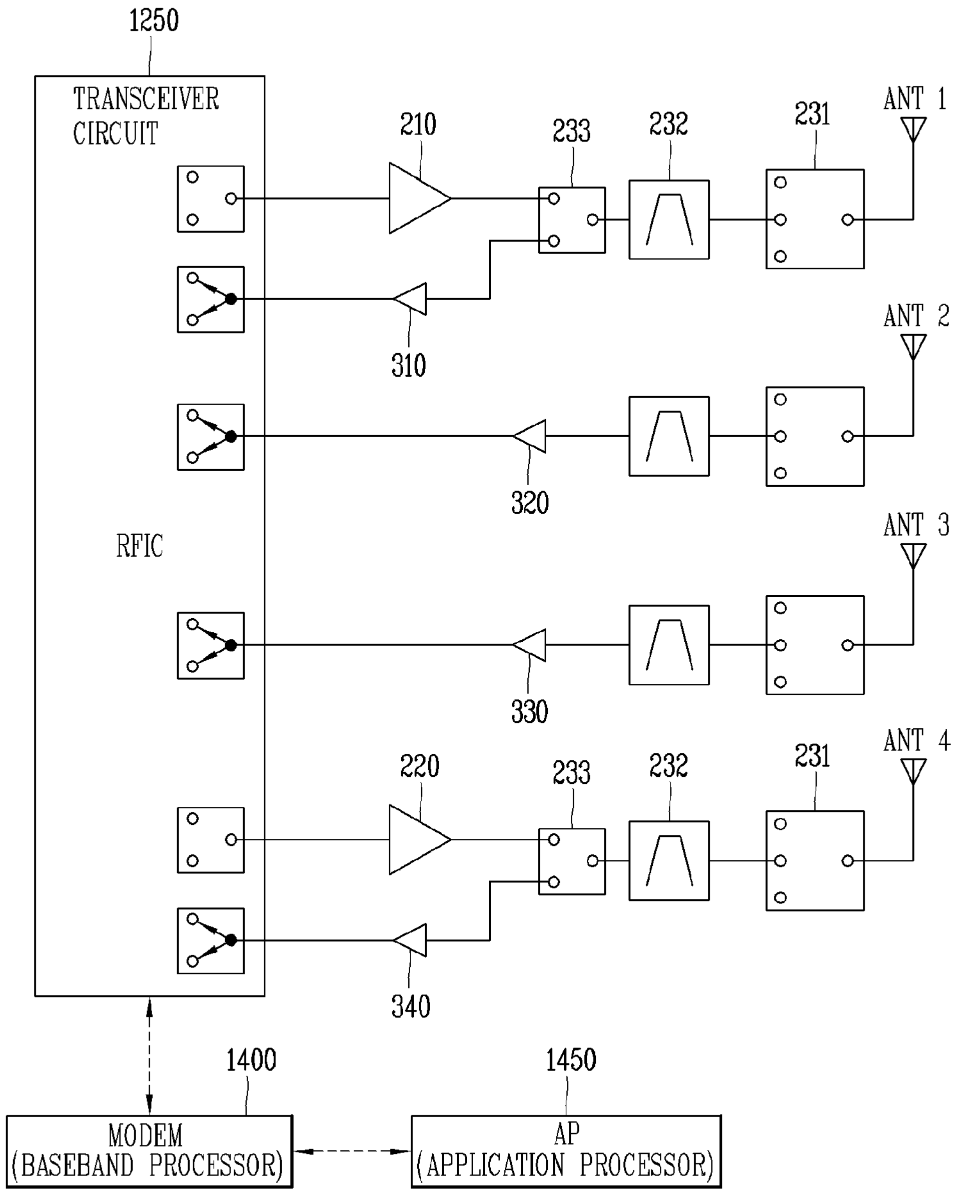
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 210*a* to 240*a* in the receiver. Here, the first power amplifier 210, the second power amplifier 220, the RFIC 1250, and the plurality of low noise amplifiers 210*a* to 40*a* may all be operable in the first communication system and the second communication system. In this case, the first communication system and the second communication system may be a 4G communication system and a 5G communication system, respectively.

As illustrated in FIG. 2, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in the specific time interval. In addition, the RFIC 1250 may control reception circuits including the first to fourth low noise amplifiers 310 to 340 to receive a 4G signal or a 5G signal in the specific time interval.

Hereinafter, a description will be given of an antenna system mounted on the vehicle according to FIGS. 2 to 4 and broadband antennas (e.g., cone antennas) that can operate in the range from a low frequency band to about 5 GHz band.

Figure 5A:
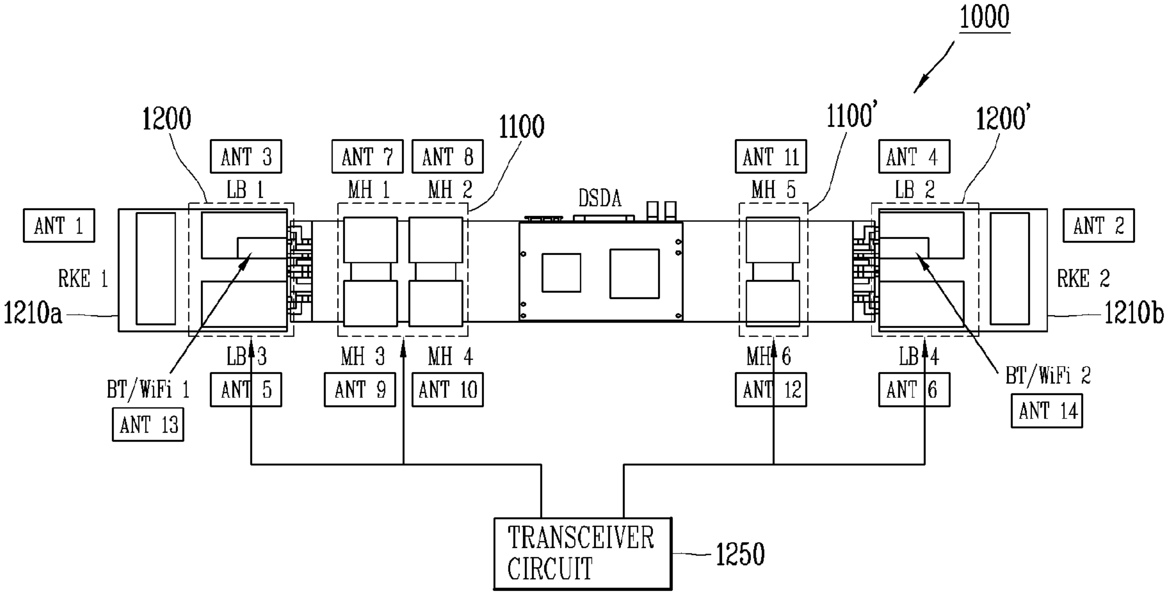
FIG. 5A is a conceptual view illustrating an example of an antenna system including a plurality of cone antennas and other antennas.
Figure 5B:
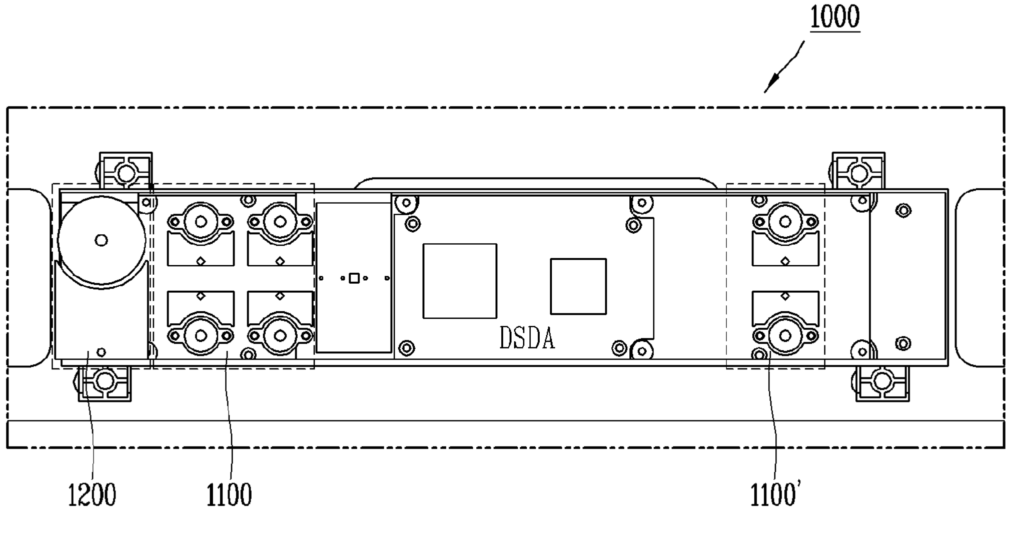
FIG. 5B is a front view illustrating the antenna system including the plurality of cone antennas and the other antennas.

FIG. 5A is a conceptual view illustrating an example of an antenna system including a plurality of cone antennas and other antennas. FIG. 5B is a front view illustrating the antenna system including the plurality of cone antennas and the other antennas.

Figure 6:
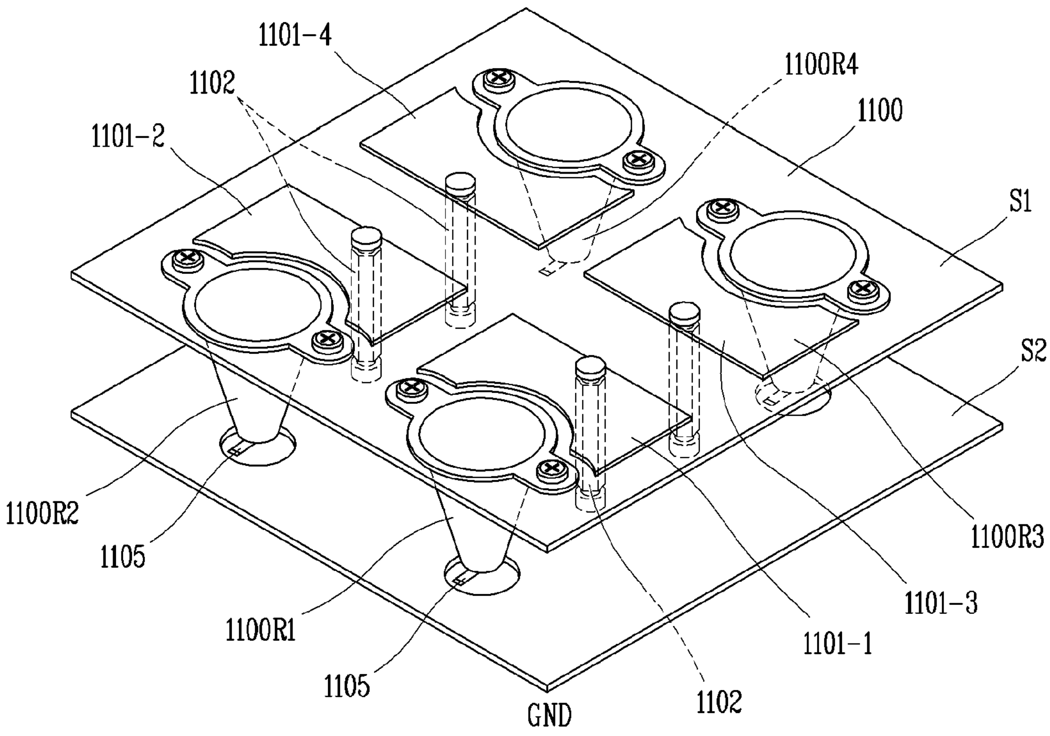
FIG. 6 is a view illustrating an example of a conical array antenna that can operate in a first frequency band.
Figure 7:
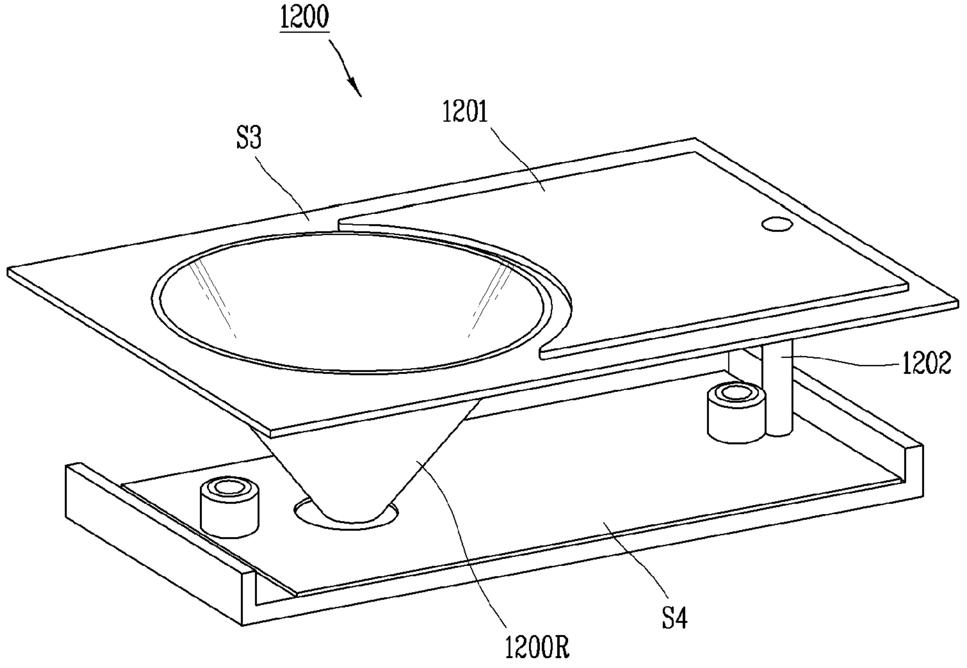
FIG. 7 is a view illustrating an example of a second type cone antenna that can operate in a second frequency band.

FIG. 6 is a view illustrating an example of a conical array antenna that can operate in a first frequency band. FIG. 7 is a view illustrating an example of a second type cone antenna that can operate in a second frequency band. Here, a conical array antenna that can operate in a first frequency band may be referred to as a first type cone (array) antenna. Also, a conical array antenna that can operate in a second frequency band may be referred to as a second type cone antenna. The first frequency band may include a middle band MB starting from 1400 MHz and a higher band HB which is a higher frequency band than the middle band MB. On the other hand, the second frequency band may be a low band LB starting from 650 MHz.

Referring to FIGS. 5A to 7, a vehicle including a plurality of cone antennas according to the present disclosure may include a conical array antenna 1100, a patch array radiator 1101, a shorting pin 1102, and a feeder 1105. In this regard, the conical array antenna 1100 may be disposed between the first substrate S1 and the second substrate S2. Here, the second substrate S2 may be spaced apart from the first substrate S1 by a predetermined distance, and may include a ground layer GND. The conical array antenna 1100 may have an upper portion connected to the first substrate S1 and a lower portion connected to the second substrate S2, and include cone radiators 1100R each having an upper aperture arranged at predetermined distances.

The conical array antenna 1100 may include 2×2 conical array antennas at predetermined distances in a horizontal direction and a vertical direction. Here, the 2×2 conical array antennas 1100 may include first to fourth cone radiators 1101R1 to 1101R4. First to fourth cone antennas constituting the 2×2 conical array antennas 1100 may be referred to as MH1 to MH4 antennas. Here, the MH1 to MH4 antennas refer to first to fourth cone antennas operating in the middle band MB and the high band HB.

On the other hand, the patch array radiator 1101 may include 2×2 metal patches 1101-1 to 1101-4 disposed to be spaced apart from upper apertures of the first to fourth cone radiators 1100R1 to 1100R4. Accordingly, the patch array radiator 1101 may include the metal patches 1101-1 to 1101-4 disposed on the first substrate S1 to be spaced apart from the upper apertures of the first to fourth cone radiators 1100R1 to 1100R4.

Accordingly, the transceiver circuit 1250 can control a signal to be radiated through at least one of the conical array antennas 1100. Specifically, the transceiver circuit 1250 may perform multi-input/multi-output (MIMO) in the first frequency band through the 2×2 conical array antennas. Accordingly, first to fourth signals of the first frequency band can be simultaneously received and thus first to fourth information included in the first to fourth signals can be simultaneously acquired (decoded). In relation to MIMO, two or more signals can be simultaneously received to simultaneously acquire (decode) two or more pieces of information.

The shorting pins 1102 may be disposed to electrically connect the metal patches 1101-1 to 1101-4 and the ground layer GND of the second substrate S2. Specifically, the shorting pins 1102 may be disposed at the cone radiators 1100R1 to 1100R4, respectively, to connect the metal patches 1101-1 to 1101-4 and the ground layer GND.

On the other hand, the broadband antenna (e.g., cone antenna) capable of operating from a low frequency band to about 5 GHz band may further include a second type cone antenna 1200 operating in a second frequency band, in addition to the conical array antenna 1100 operating in the first frequency band. Specifically, the second type cone antenna 1200 may be spaced apart from the conical array antenna 1100 by a predetermined distance, and may operate in a second frequency band that is lower than that of the conical array antenna 1100.

Here, the conical array antenna 1100 operating in the first frequency band may be referred to as a first type cone antenna, and the cone antenna 1200 operating in the second frequency band may be referred to as a second type cone antenna. In this regard, an entire frequency band including the first frequency band and the second frequency band may be implemented by a single cone antenna.

However, an arrangement space for an antenna system mounted on a roof frame of a vehicle may be larger than that in an electronic device. Accordingly, signal transmission and/or reception can be allowed through the conical array antenna 1100 in the second frequency band as the low frequency band (LB). In addition, signal transmission and/or reception of signal can be allowed through the second type cone antenna 1200 in the middle frequency band (MB) and the high frequency band (HB).

The second type cone antenna 1200 operating in the low frequency band may include a second type cone radiator 1200R and a second metal patch 1201. In addition, the second type cone radiator 1200R may be disposed between the first substrate S1 and the second substrate S2 and have an upper portion connected to the first substrate S1 and a lower portion connected to the second substrate S2. A second upper aperture may be formed through the upper portion. Here, a diameter of the second upper aperture of the second type cone antenna 1200 operating in the low frequency band may be larger than a diameter of the upper aperture of the cone antenna 1100.

The second metal patch 1201 may be disposed to be spaced apart from the second upper aperture of the second type cone antenna 1200. The second metal patch 1201 may be a rectangular patch. However, the shape of the second metal patch 1201 may not be limited to the rectangle. The second metal patch 1201 may alternatively be implemented as a circular patch or an arbitrary polygonal shape. In this regard, since there is not a great limit to the arrangement space of the antenna mounted on the vehicle, the second metal patch 1201 may be implemented as the rectangular patch.

Referring to FIG. 7, the second type cone antenna 1200 may be provided on a different substrate from the first type cone antenna 1100. In this regard, the transceiver circuit 1250 may be implemented in a structure capable of interfacing with different substrates. Accordingly, when the first type cone antenna 1100 and the second type cone antenna 1200 are disposed on different substrates, a lower interference level can be maintained between the radiator and the circuit.

The second type cone antenna 1200 may include a second type cone radiator 1200R and a second metal patch 1201. The second type cone radiator 1200R may be disposed between a third substrate S3 and a fourth substrate S4 and have an upper portion connected to the third substrate S3 and a lower portion connected to the fourth substrate S4. A second upper aperture may be formed through the upper portion. In this regard, the fourth substrate S4 may be spaced apart from the third substrate S3 by a predetermined distance, and may include a ground layer GND. Here, a diameter of the second upper aperture of the second type cone antenna 1200 operating in the low frequency band may be larger than a diameter of the upper aperture of the cone antenna 1100.

The second metal patch 1201 may be disposed to be spaced apart from the second upper aperture of the second type cone antenna 1200. The second metal patch 1201 may be a rectangular patch. However, the shape of the second metal patch 1201 may not be limited to the rectangle. The second metal patch 1201 may alternatively be implemented as a circular patch or an arbitrary polygonal shape. In this regard, since there is not a great limit to the arrangement space of the antenna mounted on the vehicle, the second metal patch 1201 may be implemented as the rectangular patch.

The second type cone antenna 1200 may be disposed at one side of the conical array antenna 1100. Another second type cone antenna 1200' may be disposed at another side of the conical array antenna 1100. Accordingly, the second type cone antennas 1200 and 1200' can be implemented as 2×1 array antennas.

Referring to FIGS. 5A, 5B, and 7, the second type cone antenna 1200 may be implemented as 1×2 array antennas disposed at one side of the conical array antenna 1100. Another second type cone antenna 1200' may be implemented as 1×2 array antennas disposed at another side of the conical array antenna 1100. Accordingly, the second type cone antennas 1200 and 1200' can be implemented as 2×2 array antennas. In this regard, a distance between the 1×2 array antennas disposed at the one side and the 1×2 array antennas disposed at the another side may be longer than a distance between the conical array antennas. This can secure a predetermined level of isolation or more between the second type cone antennas 1200 and 1200' operating in the low frequency band.

On the other hand, the transceiver circuit 1250 may perform MIMO in the first frequency band through the 2×2 conical array antennas 1100. Accordingly, UL or DL MIMO by up to four transmission/reception streams (4 Tx or 4 Rx) can be allowed in the first frequency band.

The transceiver circuit 1250 may also perform MIMO in the second frequency band lower than the first frequency band through the 2×2 array antennas by the second type cone antennas 1200 and 1200'. Accordingly, UL or DL MIMO by up to four transmission/reception streams (4 Tx or 4 Rx) can also be allowed in the second frequency band as the low frequency band.

When the second type cone antennas 1200 and 1200' are implemented as the 2×1 array antennas, the transceiver circuit 1250 may perform MIMO in the second frequency band through the 2×1 array antennas. Accordingly, UL or DL MIMO by up to two transmission/reception streams (2 Tx or 2 Rx) can be allowed in the second frequency band as the low frequency band.

Meanwhile, Carrier Aggregation (CA) may be performed through at least one of the first type cone antennas 1100 and at least one of the second type cone antennas 1200 and 1200' according to the present disclosure. That is, the processor 1400 may control the transceiver circuit 1250 to perform CA for the first frequency band through at least one of the first type cone antennas 1100 and the second frequency band through at least one of the second type cone antennas 1200 and 1200'. To this end, the transceiver circuit 1250 may include a first RFIC operating in the first frequency band and a second RFIC operating in the second frequency band. The processor 1400 may control the first RFIC and the second RFIC to operate simultaneously.

In relation to the first type cone antenna operating in the first frequency band, a second conical array antenna 1100' may be further included. In this regard, the second conical array antenna 1100' may be disposed between the conical array antenna 1100 and the second type cone antenna 1200' located at the another side of the conical array antenna 1100. Here, the second type cone antenna 1200' may be a single cone antenna or 1×2 conical array antennas.

Both the conical array antenna 1100 and the second conical array antenna 1100' may operate in the first frequency band. Here, the conical array antenna 1100 may be 2×2 array antennas arranged in a horizontal direction and a vertical direction. On the other hand, the second conical array antenna 1100' may be 1×2 array antennas arranged only in the vertical direction. However, the present disclosure is not limited to such an arrangement, and the arrangement may variously change depending on applications in terms of vehicle arrangement space and antenna characteristics.

Meanwhile, the transceiver circuit 1250 may perform MIMO in the first frequency band through at least one of the conical array antennas 1100 and at least one of the second conical array antennas 1100'. In this regard, in order to reduce the level of interference between antenna elements that are subjected to MIMO in the same frequency band, a predetermined distance or more may preferably be set between the antenna elements. Therefore, when MIMO is performed using adjacent antenna elements of the conical array antennas 1100, interference may occur between the antenna elements. In order to solve this problem, MIMO may be performed through at least one of the conical array antennas 1100 and at least one of the second conical array antennas 1100'.

Accordingly, different information can be obtained through at least one of the conical array antennas 1100 and at least one of the second conical array antennas 1100' with a low interference level between the antennas. That is, a first signal received through at least one of the conical array antennas 1100 and a second signal received through at least one of the second conical array antennas 1100' may include different information (e.g., first information and second information). On the other hand, a diversity operation may be performed to obtain the same information by using the antenna element in the conical array antenna 1100 or the antenna element in the second conical array antenna 1100'. That is, the first and second signals received through the antenna element in the conical array antenna 1100 may all include the same information. Also, the first and second signals received through the antenna element in the second conical array antenna 1100' may all include the same information.

Meanwhile, as described above, the second type cone antennas 1200 and 1200' operating in the first frequency band, which is the low frequency band, may be implemented with two or four antennas. In this regard, the second type cone antennas 1200 and 1200' may include a first antenna module 1210*a* and a second antenna module 1210*b*. Here, the first antenna module 1210*a* may include one antenna and the second antenna module 1210*b* may also include one antenna. Accordingly, the second type cone antennas 1200 and 1200' may be implemented with two antennas.

Alternatively, the first antenna module 1210*a* may include first and second cone antennas 1200 vertically disposed at one side (i.e., left side) of the conical array antenna 1100. On the other hand, the second antenna module 1210*b* may include third and fourth cone antennas 1200' vertically disposed at another side (i.e., right side) of the second conical array antenna 1100'. Accordingly, the second type cone antennas 1200 and 1200' can operate in the second frequency band that is a lower frequency band than the first frequency band.

In this regard, the transceiver circuit 1250 may perform MIMO through one of the first and second cone antennas 1200 and one of the third and fourth cone antennas 1200'. Accordingly, the first signal and the second signal can be received through one of the first and second cone antennas 1200 and one of the third and fourth cone antennas 1200' spaced apart from each other in the horizontal direction to have a low interference level therebetween.

On the other hand, the feeder 1105 may be attached to the lower aperture of each conical array antenna 1100 on the second substrate S2, so as to transfer a signal. That is, the feeder 1105 may be disposed on the second substrate S2 and transfer a signal to the cone radiator 1100R of the conical array antenna 1100 through the lower aperture of the cone radiator 1100R of the conical array antenna 1100. In this regard, an end portion of the feeder 1105 may be formed in a ring shape to match the shape of the lower aperture.

Similarly, a feeder 1205 may be attached to the second lower aperture of the second type cone antenna 1200 on the second substrate S2 or the fourth substrate S4, so as to transfer a signal. In this regard, an end portion of the feeder 1205 may be formed in a ring shape to match the shape of the second lower aperture. On the other hand, since the second type cone antenna 1200 operates in the low frequency band, a ring diameter of the feeder 1205 may be larger than a ring diameter of the feeder 1105.

Meanwhile, the first and second antenna modules 1210*a* and 1210*b* may further include remote keyless entry (RKE) antennas RKE1 and RKE2, respectively. Here, the first and second antenna modules 1210*a* and 1210*b* may be implemented as patch type antennas other than the aforementioned second type cone antennas 1200 and 1200'. Alternatively, the first and second antenna modules 1210*a* and 1210*b* may be implemented in a structure including both the aforementioned second type cone antennas 1200 and 1200' and the patch type antennas. Accordingly, the second type cone antennas 1200 and 1200' and the patch type antennas such as the RKE antennas RKE1 and RKE2 may be referred to as the first and second antenna modules 1210*a* and 1210*b*.

Meanwhile, the first and second antenna modules 1210*a* and 1210*b* may further include therein antennas ANT 13 and ANT 14 operating in Bluetooth and Wi-Fi bands.

Meanwhile, the antenna system 1000 may further include a digital satellite dual antenna (DSDA) disposed between the conical array antenna 1100 and the second conical array antenna 1100' and configured to receive a satellite signal.

So far, the vehicle including the conical array antennas and the transceiver circuit according to one aspect (configuration) has been described. Hereinafter, an antenna system including a conical array antenna and a feeder according to another aspect of the present disclosure will be described.

Referring to FIGS. 2 to 7, the vehicle 300 having antennas may include the conical array antenna 1100, the patch array radiator 1101, the shorting pin 1102, and the feeder 1105.

The conical array antenna 1100 may be disposed between the first substrate S1 and the second substrate S2 to vertically connect the first substrate S1 and the second substrate S2. The conical array antenna 1100 may also have an upper portion connected to the first substrate S1 and a lower portion connected to the second substrate S2, and include cone radiators 1100R each having an upper aperture arranged at predetermined distances.

The patch array radiator 1101 may include metal patches 1101-1 to 1101-4 disposed on the first substrate S1 to be spaced apart from the upper apertures. The shorting pin 1102 may be disposed to electrically connect the metal patch 1101-1 to 1101-4 and the ground layer GND of the second substrate S2. In this regard, the shorting pins 1102 may be disposed at the cone radiators 1100R, respectively, to connect the metal patches 1100 and the ground layer GND.

On the other hand, the feeder 1105 may be attached to the lower aperture of each conical array antenna 1100 on the second substrate S2, so as to transfer a signal. That is, the feeder 1105 may be disposed on the second substrate S2 and transfer a signal to the cone radiator 1100R of the conical array antenna 1100 through the lower aperture of the cone radiator 1100R of the conical array antenna 1100. In this regard, an end portion of the feeder 1105 may be formed in a ring shape to match the shape of the lower aperture.

Similarly, a feeder 1205 may be attached to the second lower aperture of the second type cone antenna 1200 on the second substrate S2 or the fourth substrate S4, so as to transfer a signal. In this regard, an end portion of the feeder 1205 may be formed in a ring shape to match the shape of the second lower aperture. On the other hand, since the second type cone antenna 1200 operates in the low frequency band, a ring diameter of the feeder 1205 may be larger than a ring diameter of the feeder 1105.

The conical array antenna 1100 may have a 2×2 conical array antenna arrangement at predetermined distances in a horizontal direction and a vertical direction. Accordingly, the transceiver circuit 1250 may perform MIMO in the first frequency band through the 2×2 conical array antennas.

Meanwhile, the vehicle 300 may further include the second type cone antenna 1200 operating in the second frequency band that is the low frequency band. The second type cone antenna 1200 may be spaced apart from the conical array antenna 1100 by a predetermined distance, and may operate in the second frequency band that is lower than that of the conical array antenna 1100.

Specifically, the second type cone antenna 1200 may be implemented as 2×2 array antennas by 1×2 array antennas disposed at one side of the conical array antenna 1100 and 1×2 array antennas disposed at another side of the conical array antenna 1100. Alternatively, the second type cone antenna 1200 may be implemented as 2×1 array antennas by a cone antenna disposed at one side of the conical array antenna 1100 and another cone antenna disposed at another side of the conical array antenna 1100.

In this regard, a distance between the 1×2 array antennas disposed at the one side and the 1×2 array antennas disposed at the another side may be longer than a distance between elements in the conical array antenna. Alternatively, a distance between the cone antenna disposed at the one side and the another cone antenna disposed at the another side may be longer than a distance between the elements in the conical array antenna. Accordingly, an antenna element arrangement structure having a longer distance between antenna elements in the second frequency band, which is the low frequency band can be provided.

Hereinafter, the cone antenna 1100 mounted on the vehicle will be described in detail.

Specifically, the cone antenna 1100 may include the first substrate S1 corresponding to the upper substrate, the second substrate S2 corresponding to the lower substrate, and the cone radiator 1100R. In addition, the cone antenna 1100 may further include the metal patch 1101, the shorting pin 1102, and the feeder 105.

Also, the cone antenna 1100 may further include an outer rim 1103 and a fastener 1104 to be fixed to the first substrate S1 through the outer rim 1103. In addition, the cone antenna 1100 may further include non-metal supporters, and a fastener 1107 for fastening the feeder 1105. Here, the fasteners 1104 and 1107 may be implemented as fasteners such as screws having a predetermined diameter.

In this regard, the second substrate S2 may be spaced apart from the first substrate S1 by a predetermined distance, and may include a ground layer GND. Meanwhile, the cone radiator 1100R may be disposed between the first substrate S1 and the second substrate S2. Specifically, the cone radiator 1100R may allow the first substrate S1 and the second substrate S2 to be vertically connected to each other. In addition, the cone radiator 1100R may have an upper portion connected to the first substrate S1 and a lower portion connected to the second substrate S2, and have an upper aperture.

Meanwhile, the metal patch 1101 may be disposed on the first substrate S1 to be spaced apart from the upper aperture. Specifically, an inner side of the metal patch 1101 may be formed in a circular shape to correspond to a shape of an outline of the upper aperture. With the configuration, a signal radiated from the cone radiator 1100R may be coupled through the inner side of the metal patch 1101.

Meanwhile, the metal patch 1101 may be disposed at only one side to cover a partial region of the upper aperture of the cone antenna 1100. Accordingly, an overall size of the cone antenna 1100 including the metal patch 1101 can be minimized.

The shorting pin 1102 may be provided to electrically connect the metal patch 1101 and the ground layer GND of the second substrate S2. On the other hand, the shorting pin 1102 can be implemented in a structure in which a fastener such as a screw having a predetermined diameter is inserted into a structure such as a dielectric.

In this regard, in order to arrange a plurality of cone antennas in an electronic device, the cone antennas need to be implemented in a small size. A cone antenna structure according to the present disclosure for this purpose may be referred to as "Cone with shorting pin" or "Cone with shorting supporter".

In this regard, the number of shorting pins or shorting supporters may be one or two. Specifically, the number of shorting pins or shorting supports may not be limited thereto and may vary depending on applications. However, in the structure "Cone with shorting pin" or "Cone with shorting supporter" according to the present disclosure, one or two shorting pins or shorting supporters may be provided to reduce the size of the antenna.

Specifically, one shorting pin 1102 may be provided between the metal patch 1101 and the second substrate S2. Such a single shorting pin 1102 can prevent generation of a null of a radiation pattern of the cone antenna. An operating principle and technical characteristics thereof will be described in detail later with reference to FIGS. 7A and 7B.

In this regard, a typical cone antenna has a problem in that a null of a radiation pattern is generated at a boresight in an elevation direction so as to deteriorate reception performance. In order to solve this problem, in the present disclosure, the null of the radiation pattern at the boresight in the elevation direction may be removed by a structure in which the cone antenna 1110 is connected to the single shorting pin 1102. Accordingly, the present disclosure can have an advantage that reception performance can be improved in almost all directions.

In this regard, the cone antenna with the one shorting pin may form a current path of the feeder 1105—the cone radiator 1100R—the metal patch 1101—the shorting pin 1102—the ground layer GND. In this way, through the asymmetric current path of the feeder 1105—the cone radiator 1100R—the metal patch 1101—the shorting pin 1102—the ground layer GND, the generation of the null of the radiation pattern at the boresight in the elevation direction can be prevented.

The feeder 1105 may be disposed on the second substrate S2 to transmit a signal through the lower aperture. To this end, the feeder 1105 may have an end portion formed in a ring shape to correspond to the shape of the lower aperture.

On the other hand, the cone antenna according to the present disclosure may further include at least one non-metal supporter to mechanically fix the cone radiator 1100R, the first substrate S1, and the second substrate S2. To this end, the at least one non-metal supporter may vertically connect the first substrate S1 and the second substrate S2 to support the first substrate S1 and the second substrate S2. On the other hand, since the non-metal supporter is not a metal and is not electrically connected to the metal patch 1101, the non-metal supporter may not affect electrical characteristics of the cone antenna 1100. Accordingly, the non-metal supporter may be disposed between the first and second substrates S1 and S2 on each of a left upper portion, a right upper portion, a left lower portion, and a right lower portion, so as to vertically connect and support the first substrate S1 and the second substrate S2. However, the present disclosure may not be limited thereto, and various structures capable of supporting the first substrate S1 and the second substrate S2 may be applied according to applications.

Meanwhile, the outer rim 1103 may be integrally formed with the cone radiator 1100R, and may be connected to the first substrate S1 through the fastener 1104. Here, the outer rim 1103 may be provided by two on opposite points of the cone radiator 1100R.

On the other hand, the fastener 1107 may be fastened to the second substrate S2 through an inside of the end portion (i.e., the ring shape) of the feeder 1105. Accordingly, the second substrate S2 having the feeder 1105 can be fixed to the cone radiator 1100R through the fastener 1107. Therefore, the fastener 1107 can serve to fix the cone radiator 1100R to the second substrate S2 as well as transmitting a signal to the cone radiator 1100R.

Figure 8A:
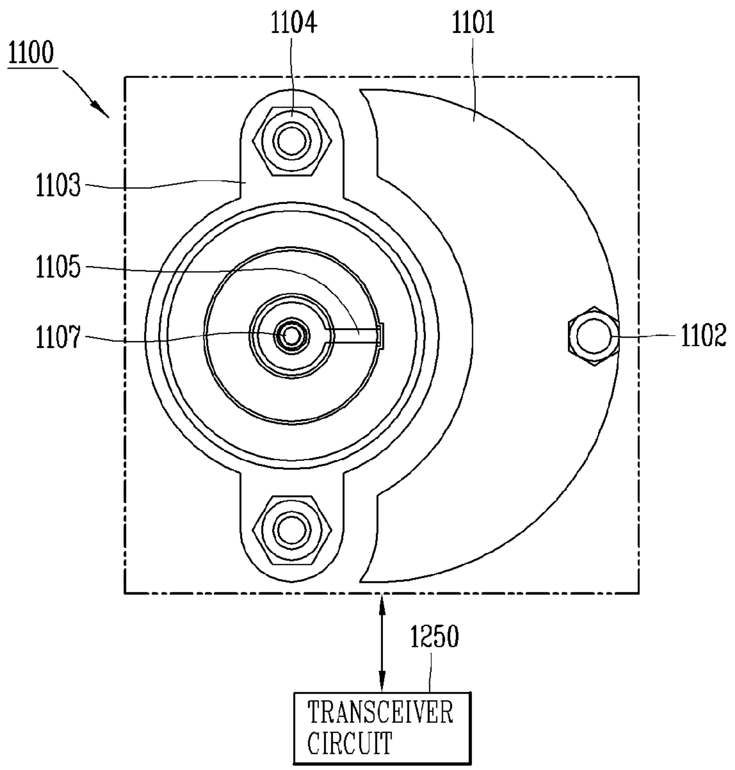
FIGS. 8A and 8B are front views illustrating an example of a cone antenna having a structure of "Cone with single shorting pin".
Figure 8B:
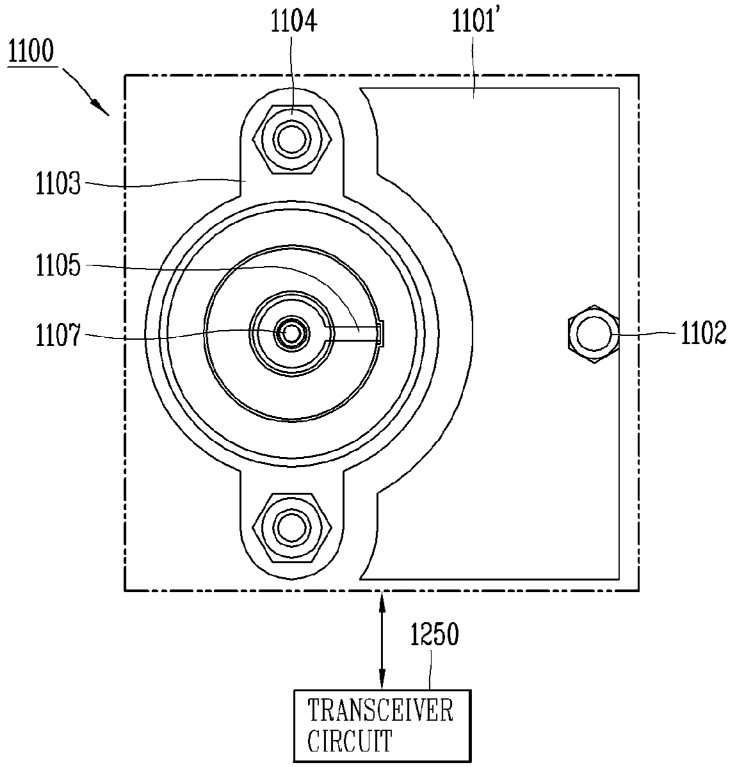

FIGS. 8A and 8B are front views illustrating an example of a cone antenna having a structure of "Cone with single shorting pin". In this regard, the structure of "Cone with single shorting pin" may be a cone antenna implemented by one shorting pin (or shorting support). Specifically, FIG. 8A illustrates a shape in which a circular metal patch is disposed at one side of the upper aperture of the cone radiator. On the other hand, FIG. 8B illustrates a shape in which a rectangular metal patch is disposed at one side of the upper aperture of the cone radiator.

Referring to FIGS. 8A and 8B, an electronic device according to the present disclosure may include a cone antenna 1100. The electronic device may further include a transceiver circuit 1250.

Referring to FIGS. 5A, 5B, 8A, and 8B, the cone antenna 1100 may be disposed between a first substrate as an upper substrate and a second substrate as a lower substrate. The cone antenna 1100 may include a metal patch 1101, 1101', 1101*a*, 1101*b*, and a shorting pin 1102. Here, the metal patch 1101 may be disposed at a surrounding region of one side of an upper aperture of the cone antenna 1100. In this regard, the metal patch 1101 may be disposed on the first substrate. Here, the cone antenna 1100 may refer to only a hollow cone antenna or an entire antenna structure including the metal patch 1101.

Specifically, the metal patch 1101, 1101', 1101*a*, 1101*b* may be disposed at the surrounding region of the upper aperture of the cone antenna 1100 and disposed on an upper portion of the first substrate. Accordingly, the metal patch 1101 can be disposed at a position spaced apart from the upper aperture of the cone antenna 1100 in a z-axis by a thickness of the first substrate. As such, when the metal patch 1101 is disposed on the upper portion of the first substrate, the cone antenna 1100 can be advantageously more reduced in size. Specifically, since the first substrate having a predetermined dielectric constant is disposed on an upper region of the cone antenna 1100 including the metal patch 1101, the size of the cone antenna 1100 can be advantageously more reduced.

Alternatively, the metal patch 1101, 1101', 1101*a*, 1101*b* may be disposed at the surrounding region of the upper aperture of the cone antenna 1100 and disposed on a lower portion of the first substrate. Accordingly, the metal patch 1101 can be spaced apart from the upper aperture of the cone antenna 1100 by a predetermined distance on the same plane on the z-axis. As such, when the metal patch 1101 is disposed on the lower portion of the first substrate, the first substrate can operate as a radome of the cone antenna 1100 including the metal patch 1101. Accordingly, the cone antenna 1100 including the metal patch 1101 can be protected from outside and a gain of the cone antenna 1100 can be increased.

The shorting pin 1102 may be provided to connect the metal patch 1101, 1101', 1101*a*, 1101*b* and a ground layer GND formed on the second substrate. As such, the size of the cone antenna 1100 can be advantageously reduced by the shorting pin 1102 configured to connect the metal patch 1101 and the ground layer GND formed on the second substrate. The shorting pin 1102 may be provided by one or two in number. A case in which the shorting pin 1102 is provided by one may be most advantageous in terms of miniaturization of the cone antenna 1100. Therefore, the shorting pin 1102 may be provided by one between the metal patch and the second substrate as the lower substrate. However, the number of shorting pins may not be limited thereto, and two or more shorting pins may be used in terms of performance and structural stability of the cone antenna 1100. Depending on applications, some pins other than the shorting pin 1102 may be implemented as non-metal supporting pins of a non-metal type.

The transceiver circuit 1250 may be connected to the cone radiator 1100R through the feeder 1105 to radiate a signal through the cone antenna 1100. In this regard, the transceiver circuit 1250, as illustrated in FIG. 4, may include a power amplifier 210 and a low-noise amplifier 310 at the front end. Accordingly, the transceiver circuit 1250 may control the power amplifier 210 to radiate a signal, which is amplified through the power amplifier 210, through the cone antenna 1100. Also, the transceiver circuit 1250 may control the low noise amplifier 310 to amplify a signal received from the cone antenna 1100 through the low-noise amplifier 310. In addition, the transceiver circuit 1250 may control elements inside the transceiver circuit 1250 to transmit and/or receive signals through the cone antenna 1100.

In this regard, when the electronic device includes a plurality of cone antennas, the transceiver circuit 1250 may control signals to be transmitted and/or received through at least one of the plurality of cone antennas. A case in which the transceiver circuit 1250 transmits or receives signals through only one cone antenna may be referred to as 1 Tx or 1 Rx. On the other hand, a case in which the transceiver circuit 1250 transmits or receives signals through two or more cone antennas may be referred to as n Tx or n Rx depending on the number of antennas.

For example, a case in which the transceiver circuit 1250 transmits or receives signals through two cone antennas may be referred to as 2 Tx or 2 Rx. However, a case in which the transceiver circuit 1250 transmits or receives first and second signals having the same data through two cone antennas may be referred to as 1 Tx or 2 Rx. As such, the case in which the transceiver circuit 1250 transmits or receives the first and second signals having the same data through the two cone antennas may be referred to as a diversity mode.

Meanwhile, the metal patch 1101 may be configured as a circular patch as illustrated in FIG. 8A.

Alternatively, the metal patch 1101 may be configured as a rectangular patch as illustrated in FIG. 8B. In this regard, the metal patch 1101 may be implemented as a circular patch or an arbitrary polygonal patch in view of antenna miniaturization and performance depending on applications. The arbitrary polygonal patch may be approximated to a circular patch as an order of a polygon increases.

Referring to FIG. 8A, the metal patch 1101 may be implemented as a circular patch having an outer side in a circular shape. On the other hand, an inner side of the circular patch may be formed in a circular shape to correspond to a shape of an outline of the upper aperture. Accordingly, a signal radiated from the cone antenna can be coupled through the inner side of the circular patch 1101, thereby optimizing antenna performance.

Referring to FIG. 8B, the metal patch 1101 may be implemented as a rectangular patch having an outer side in a rectangular shape. On the other hand, an inner side of the rectangular patch may be formed in a circular shape to correspond to a shape of an outline of the upper aperture. Accordingly, a signal radiated from the cone antenna can be coupled through the inner side of the rectangular patch 1101, thereby optimizing antenna performance.

Meanwhile, a resonance length may be defined by an aperture of the metal patch 1101, 1101' which is larger than the upper aperture of the cone antenna. Thus, a signal radiated from the cone antenna 1100 can be coupled through the inner side of the rectangular patch 1101, 1101'. Accordingly, the miniaturization of the cone antenna 1100 can be allowed by the aperture of the metal patch 1101, 1101' which is larger than the upper aperture of the cone antenna.

In this regard, in the structure of "Cone with single shorting pin" illustrated in FIGS. 8A and 8B, the length and width of the cone antenna 1100, i.e., L×W, may be implemented as 0.13×0.14I. Accordingly, it can be reduced to about ¼ times of 0.5I, which is a size of a general patch antenna. On the other hand, the size can be reduced to about ½ times of 0.25I, which is a size of a patch antenna having a shorting pin. Since the length and width, that is, L×W, of the cone antenna 1100 including the metal patch 1101 is 0.13×0.14I, the size of the upper aperture of the cone antenna 1100 can be realized to be smaller than that.

Therefore, in the cone antenna 1100, the metal patch 1101 may be disposed only at a partial region of the upper aperture of the cone antenna 1100 to surround the partial region. This can be advantageous in minimizing the size of the cone antenna 1100*a* including the metal patch 1101*a*.

In addition, the height, length, and width of the cone antenna 1100, that is, H×L×W may be implemented as 0.06×0.13×0.14I. Accordingly, the cone antenna 1100 according to the present disclosure having the metal patch 1101 and the shorting pin 1102 can be reduced in height compared to the related art cone antenna. Accordingly, the cone antenna 1100 having the metal patch 1101 and the shorting pin 1102 can be reduced even in height on a z-axis as well as the size on an xy plane.

Figure 9A:
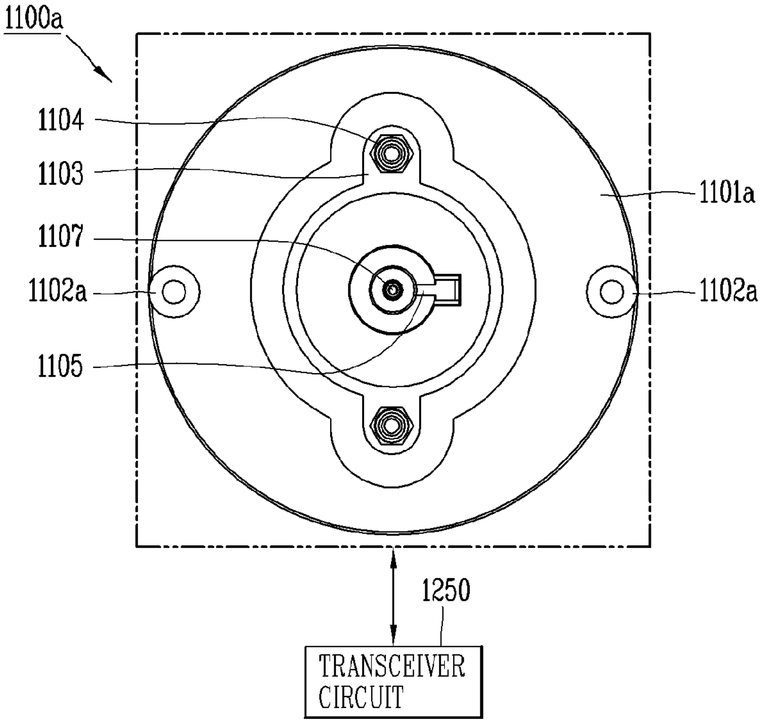
FIGS. 9A and 9B are views illustrating an electronic device having a cone antenna having a structure of "Cone with two shorting pins" according to one implementation.
Figure 9B:
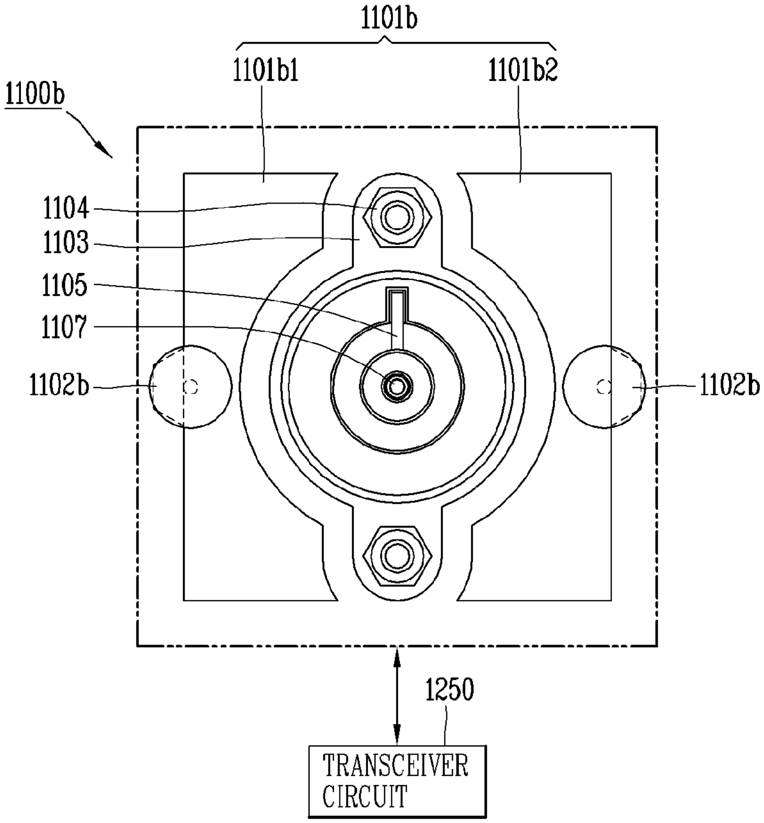

FIGS. 9A and 9B are front views illustrating a cone antenna including a circular patch and a shorting pin in accordance with another implementation. In FIG. 6A, the cone antenna 1100*a* may include a metal patch 1101*a* and two shorting pins 1102*a*. Meanwhile, the cone antenna 1100*a* may connect the first substrate and the second substrate with the two shorting pins 1102*a* and other remaining non-metal support pins.

FIGS. 9A and 9B are views of an electronic device having a cone antenna having a structure of "Cone with two shorting pins" according to one implementation. In this regard, the structure of "Cone with two shorting pins" may be a cone antenna implemented by two shorting pins (or shorting supporters). Here, the structure of FIGS. 9A and 9B may not be limited to the structure of "Cone with two shorting pins, and may alternatively be the structure of "Cone with single shorting pin". In this regard, one of the two support structures may be implemented as a shorting pin and the other as a non-metal supporter. Specifically, one of the shorting pins 1102*a* may be replaced with a non-metal support.

Referring to FIGS. 8A and 9B, the electronic device may include a cone antenna 1100*a*. The electronic device may further include a transceiver circuit 1250.

Referring to FIGS. 9A and 9B, the cone antenna 1100*a* may be disposed between the first substrate as the upper substrate and the second substrate as the lower substrate. The cone antenna 1100*a* may include a metal patch 1101*a* and shorting pins 1102*a*. Here, the metal patch 1101*a* may be disposed at a surrounding region of an upper aperture of the cone antenna 1100*a*. In this regard, the metal patch 1101 may be disposed on the first substrate.

The metal patch 1101*a* may be implemented as a circular patch to surround the entire upper aperture of the cone antenna 1100*a*. However, the metal patch 1101*a* may not be limited thereto, and may alternatively be implemented as a circular patch to surround a part of the upper aperture of the cone antenna 1100*a*. Accordingly, the circular patch may be formed at both sides of the upper aperture of the cone antenna 1100*a* or may be formed at one side.

Accordingly, in the cone antenna 1100*a* according to the present disclosure, the circular patch 1101*a* may be disposed at an entire region to surround the entire upper aperture of the cone antenna 1100*a*. Specifically, the metal patch such as the circular patch 1101*a* may be disposed at both of one side and another side opposite to the one side so as to surround the entire region of the upper aperture of the cone antenna.

Therefore, an overall size of the cone antenna 1100*a* having the circular patch 1101*a* and the shorting pin 1102*a* disposed in a symmetric form may be slightly increased compared to that of a cone antenna having a metal patch disposed only at one side. However, the cone antenna 1100*a* having the circular patch 1101*a* and the shorting pin 1102*a* disposed in the symmetric form can advantageously realize a symmetric radiation pattern and broadband characteristics.

Meanwhile, in the cone antenna 1100*a* according to the present disclosure, the circular patch 1101*a* may be disposed to surround a partial region of the upper aperture. Accordingly, the size of the cone antenna 1100*a* including the metal patch 1101*a* can be minimized.

Specifically, the metal patch 1101*a* may be disposed at the surrounding region of the upper aperture of the cone antenna 1100*a* on an upper portion of the first substrate. Accordingly, the metal patch 1101*a* can be disposed at a position spaced apart from the upper aperture of the cone antenna 1100*a* in a z-axis by a thickness of the first substrate. As such, when the metal patch 1101*a* is disposed on the upper portion of the first substrate, the cone antenna 1100*a* can be advantageously more reduced in size. Specifically, since the first substrate having a predetermined dielectric constant is disposed on the upper region of the cone antenna 1100*a* including the metal patch 1101*a*, the size of the cone antenna 1100*a* can be advantageously more reduced.

Specifically, the metal patch 1101 may be disposed at the surrounding region of the upper aperture of the cone antenna 1100*a* on a lower portion of the first substrate. Accordingly, the metal patch 1101*a* can be spaced apart from the upper aperture of the cone antenna 1100*a* by a predetermined distance on the same plane on the z-axis. As such, when the metal patch 1101*a* is disposed on the lower portion of the first substrate, the first substrate can operate as a radome of the cone antenna 1100*a* including the metal patch 1101*a*. Accordingly, the cone antenna 1100*a* including the metal patch 1101*a* can be protected from outside and a gain of the cone antenna 1100*a* can be increased.

The shorting pin 1102*a* may be provided to connect the metal patch 1101*a* and a ground layer GND formed on the second substrate. As such, the size of the cone antenna 1100*a* can be advantageously reduced by the shorting pin 1102*a* configured to connect the metal patch 1101*a* and the ground layer GND formed on the second substrate.

Referring to FIG. 9A, the metal patch 1101*a* may be implemented as a circular patch having an outer side in a circular shape. On the other hand, an inner side of the circular patch may be formed in a circular shape to correspond to a shape of an outline of the upper aperture. Accordingly, a signal radiated from the cone antenna can be coupled through the inner side of the circular patch 1101*a*, thereby optimizing antenna performance.

Meanwhile, a resonance length may be defined by an aperture of the metal patch 1101*a* which is larger than the upper aperture of the cone antenna. Thus, a signal radiated from the cone antenna 1100*a* can be coupled through the inner side of the circular patch 1101*a*. Accordingly, the miniaturization of the cone antenna 1100*a* can be allowed by the aperture of the circular patch 1101*a* which is larger than the upper aperture of the cone antenna.

In this regard, in the structure "Cone with two shorting pins on circular patch" as illustrated in FIG. 6A, the length and width of the cone antenna 1100*a*, i.e., L×W, may be implemented as 0.22×0.22I. Accordingly, it can be reduced to about ½ times of 0.5I, which is a size of a general patch antenna. On the other hand, the size can be reduced to be smaller than 0.25I which is a size of a patch antenna having a shorting pin. Since the length and width, that is, L×W, of the cone antenna 1100*a* including the circular patch 1101*a* is 0.22×0.22I, the size of the upper aperture of the cone antenna 1100*a* can be realized to be smaller than that.

In addition, the height, length, and width of the cone antenna 1100*a*, that is, H×L×W may be implemented as 0.07×0.22×0.22I. Accordingly, the cone antenna 1100*a* according to the present disclosure having the circular patch 1101*a* and the shorting pin 1102*a* can be reduced in height compared to the related art cone antenna. Therefore, the cone antenna 1100*a* having the metal patch 1101*a* and the shorting pin 1102*a* can be reduced even in height on a z-axis as well as the size on an xy plane.

On the other hand, FIG. 9B illustrates an electronic device having a cone antenna with a structure of "Cone with two shorting pins" according to one implementation. In this regard, the structure of "Cone with two shorting pins" may be a cone antenna implemented by two shorting pins (or shorting supporters). Here, the structure of FIGS. 9A and 9B may not be limited to the structure of "Cone with two shorting pins, and may alternatively be the structure of "Cone with single shorting pin". In this regard, one of the two support structures may be implemented as a shorting pin and the other as a non-metal supporter. Specifically, one of shorting pins 1102*b* of FIG. 9B may be replaced with the non-metal supporter. Accordingly, one of the non-metal supporters may be formed on a metal patch 1101*b*1 disposed on another side.

Referring to FIG. 9B, an electronic device according to the present disclosure may include a cone antenna 1100*b*. The electronic device may further include a transceiver circuit 1250.

Referring to FIGS. 5A, 5B, and 8A to 9B, the cone antenna 1100*b* may be disposed between the first substrate as the upper substrate and the second substrate as the lower substrate. The cone antenna 1100*b* may include a metal patch 1101*b* and a shorting pin 1102*b*. Here, the metal patch 1101*b* may be disposed at a surrounding region of an upper aperture of the cone antenna 1100*b*. In this regard, the metal patch 1101 may be disposed on the first substrate.

The metal patch 1101*b* may be implemented as a rectangular patch to surround the entire upper aperture of the cone antenna 1100*b*. However, the metal patch 1101*b* may not be limited thereto, and may alternatively be implemented as a rectangular patch to surround a part of the upper aperture of the cone antenna 1100*b*. Accordingly, the rectangular patch may be disposed at both sides of the upper aperture of the cone antenna 1100*b* or may be disposed at one side.

Accordingly, in the cone antenna 1100*a* according to the present disclosure, the circular patch 1101*b* may be disposed at an entire region to surround the entire upper aperture of the cone antenna 1100*a*. In this regard, in order to reduce a size of the rectangular patch 1101*b*, the rectangular patch 1101*b* may not be formed at surrounding regions of fasteners 1104 supporting the cone antenna 1100*b*. Accordingly, the rectangular patch 1101*b* may be disposed on each of a left region and a right region of the cone antenna 1100*b*.

In this regard, the metal patch 1101*b* may include a first metal patch 1101*b*1 and a second metal patch 1101*b*2. Specifically, the first metal patch 1101*b*1 may be disposed at the left side of the upper aperture of the cone antenna 1100*b* to surround the upper aperture. Also, the second metal patch 1101*b*2 may be disposed at the right side of the upper aperture Accordingly, the first metal patch 1101*b*1 and the second metal patch 1101*b*2 may be configured such that a metal pattern is divided, thereby reducing an overall size of the antenna. In this regard, when the first metal patch 1101*b*1 and the second metal patch 1101*b*2 are connected to each other, the metal patch 1101*b* may partially operate as a radiator. Accordingly, a bandwidth of the cone antenna may be partially limited due to unwanted resonance caused due to the affection of the metal patch 1101*b* having a narrower bandwidth than the cone antenna 1100*b*.

In order to prevent such bandwidth limitation, the first metal patch 1101*b*1 and the second metal patch 1101*b*2 may be configured such that the metal pattern is divided. Accordingly, the cone antenna 1100*b* in which the metal pattern is divided by the first metal patch 1101*b*1 and the second metal patch 1101*b*2 can operate as a broadband antenna. Accordingly, the first metal patch 1101*b*1 and the second metal patch 1101*b*2 may not be disposed at regions corresponding to the outer rims 1103 forming the upper aperture.

Therefore, a width of the cone antenna 1100*b* having the rectangular patch 1101*b* and the shorting pin 1102*b* disposed in a symmetric form may be slightly increased compared to that of a cone antenna having a metal patch disposed only at one side. In this regard, the width W of an asymmetric rectangular patch structure is 0.13I, while the width W of a symmetric rectangular patch structure is 0.14I. That is, an increase in the width W of the symmetrical rectangular patch structure may not be substantially large. However, the cone antenna 1100*a* having the rectangular patch 1101*a* and the shorting pin 1102*a* disposed in the symmetric form can advantageously realize a symmetric radiation pattern and broadband characteristics.

Specifically, the rectangular patch 1101*b* may be disposed at the surrounding region of the upper aperture of the cone antenna 1100*b* on an upper portion of the first substrate. Accordingly, the metal patch 1101*b* can be disposed at a position spaced apart from the upper aperture of the cone antenna 1100*b* in a z-axis by a thickness of the first substrate. As such, when the metal patch 1101*b* is disposed on the upper portion of the first substrate, the cone antenna 1100*b* can be advantageously more reduced in size. Specifically, since the first substrate having a predetermined dielectric constant is disposed on an upper region of the cone antenna 1100*b* including the metal patch 1101*b*, the size of the cone antenna 1100*b* can be advantageously more reduced.

Or, the rectangular patch 1101*b* may be disposed at the surrounding region of the upper aperture of the cone antenna 1100*b* on a lower portion of the first substrate. Accordingly, the metal patch 1101*b* can be spaced apart from the upper aperture of the cone antenna 1100*b* by a predetermined distance on the same plane on the z-axis. As such, when the metal patch 1101*b* is disposed on the lower portion of the first substrate, the first substrate can operate as a radome of the cone antenna 1100*b* including the metal patch 1101*b*. Accordingly, the cone antenna 1100*b* including the metal patch 1101*b* can be protected from outside and a gain of the cone antenna 1100*b* can be increased.

The shorting pin 1102*b* may be provided to connect the metal patch 1101*b* and a ground layer GND formed on the second substrate. As such, the size of the cone antenna 1100*a* can be advantageously reduced by the shorting pin 1102*a* configured to connect the metal patch 1101*a* and the ground layer GND formed on the second substrate.

Referring to FIG. 9B, the metal patch 1101*b* may be implemented as a rectangular patch having an outer side in a rectangular shape. On the other hand, an inner side of the rectangular patch may be formed in a circular shape to correspond to a shape of an outline of the upper aperture. Accordingly, a signal radiated from the cone antenna can be coupled through the inner side of the rectangular patch 1101*b*, thereby optimizing antenna performance.

Meanwhile, a resonance length may be defined by a circular aperture of the rectangular patch 1101*b* which is larger than the upper aperture of the cone antenna. Thus, a signal radiated from the cone antenna 1100*b* can be coupled through the inner side of the rectangular patch 1101*b*. Accordingly, the miniaturization of the cone antenna 1100*b* can be allowed by the circular aperture of the rectangular patch 1101*b* which is larger than the upper aperture of the cone antenna.

In this regard, in the structure "Cone with two shorting pins on circular patches" as illustrated in FIG. 9B, the length and width of the cone antenna 1100*b*, i.e., L×W, may be implemented as 0.14×0.14I. Accordingly, it can be reduced to about ¼ times of 0.5I, which is a size of a general patch antenna. On the other hand, the size can be reduced to about ½ times of 0.25I, which is a size of a patch antenna having a shorting pin. Since the length and width, that is, L×W, of the cone antenna 1100*b* including the circular patch 1101*b* is 0.14×0.14I, the size of the upper aperture of the cone antenna 1100*b* can be realized to be smaller than that.

In addition, the height, length, and width of the cone antenna 1100*b*, that is, H×L×W may be implemented as 0.07×0.14×0.14I. Accordingly, the cone antenna 1100*b* according to the present disclosure having the rectangular patch 1101*b* and the shorting pin 1102*b* can be reduced in height compared to the related art cone antenna. Therefore, the cone antenna 1100*b* having the rectangular patch 1102*b* and the shorting pin 1102*b* can be reduced even in height on a z-axis as well as the size on an xy plane.

On the other hand, the cone antenna 1100, 1100*a*, 1100*b* according to FIGS. 8A to 9B may be formed in a tapered conical shape such that an upper diameter is greater than a lower diameter. In addition, the cone antennas 1100, 1100*a*, 1100*b* according to FIGS. 5A to 6B may be formed in a hollow conical shape to reduce the weight of the electronic device provided with the cone antenna 1100, 1100*a*, 1100*b*.

Meanwhile, the cone antenna 1100, 1100*a*, and 1100*b* according to FIGS. 8A to 9B may include an outer rim 1103 and a fastener 1104. In this regard, the outer rim 1103 may define the upper aperture of the cone antenna 1100, 1100*a*, 1100*b*. The outer rim 1103 may also be configured to connect the first substrate, which is the upper substrate, and the cone antenna 1100, 1100*a*, 1100*b*. The fastener 1104 may connect the outer rim 1103 and the first substrate as the upper substrate. Specifically, the cone antenna 1100, 1100*a*, 1100*b* may be mechanically fastened to the first substrate through two fasteners 1104 on opposite regions of the outer rim 1103.

The shorting pin 1102, 1102*a*, 1102*b* may be disposed on a middle portion of the other side corresponding to a boundary of the metal patch 1101, 1101*a*, 1102*a*. This can minimize the size of the cone antenna 1100, 1100*a*, 1100*b* including the metal patch 1101, 1101*a*, 1102*a*.

Meanwhile, when the metal patch 1101' is disposed to surround a partial region of the upper aperture of the cone antenna 1100, the shorting pin 1102 may be provided by one. This can provide an advantage of reducing the entire size of the antenna by the one shorting pin 1102 and the metal patch 1101 disposed only at one side of the cone antenna 1100.

On the other hand, when the metal patch 1101*a*, 1101*b* is disposed to surround substantially the entire region of the upper aperture of the cone antenna 1100*a*, 1100*b*, the shorting pin 1102*a*, 1102*b* may be provided by two. When the metal patch 1101*a*, 1101*b* is disposed to substantially surround the entire region of the upper aperture, it may be advantageous to increase the number of shorting pins 1102*a*, 1102*b* in view of improving overall antenna characteristics and structural stability.

Figure 10A:
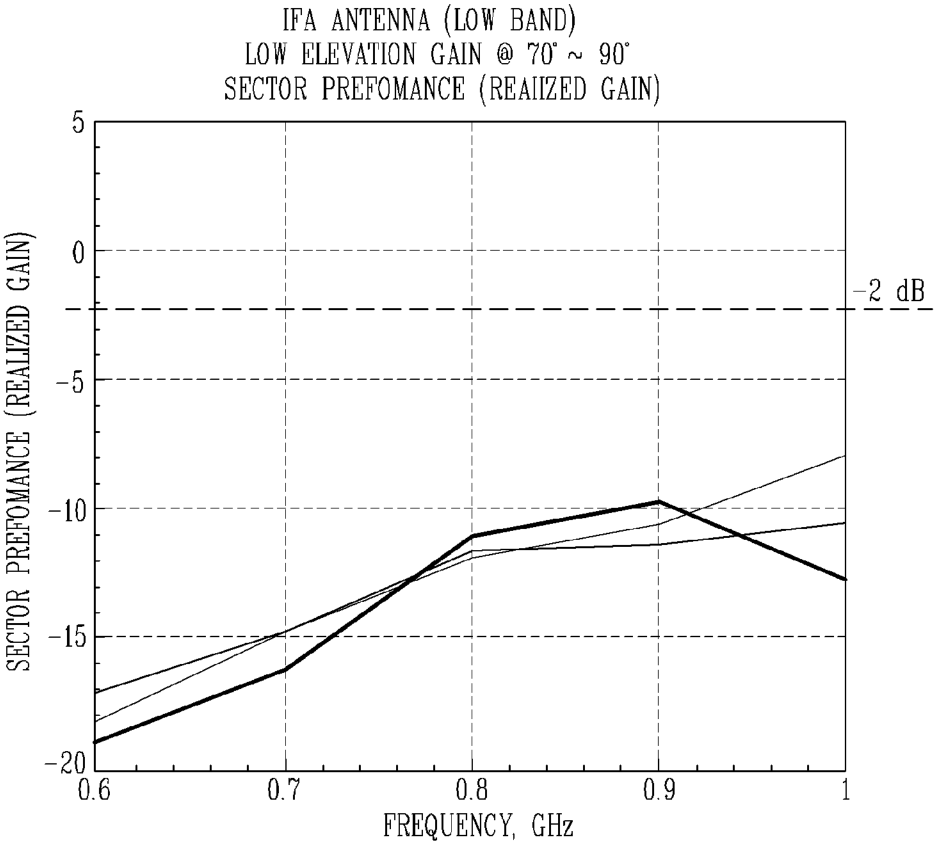
FIG. 10A is a view illustrating gain characteristics in a specific elevation range when an Inverted-F Antenna (IFA) is used in a low frequency band.
Figure 10B:
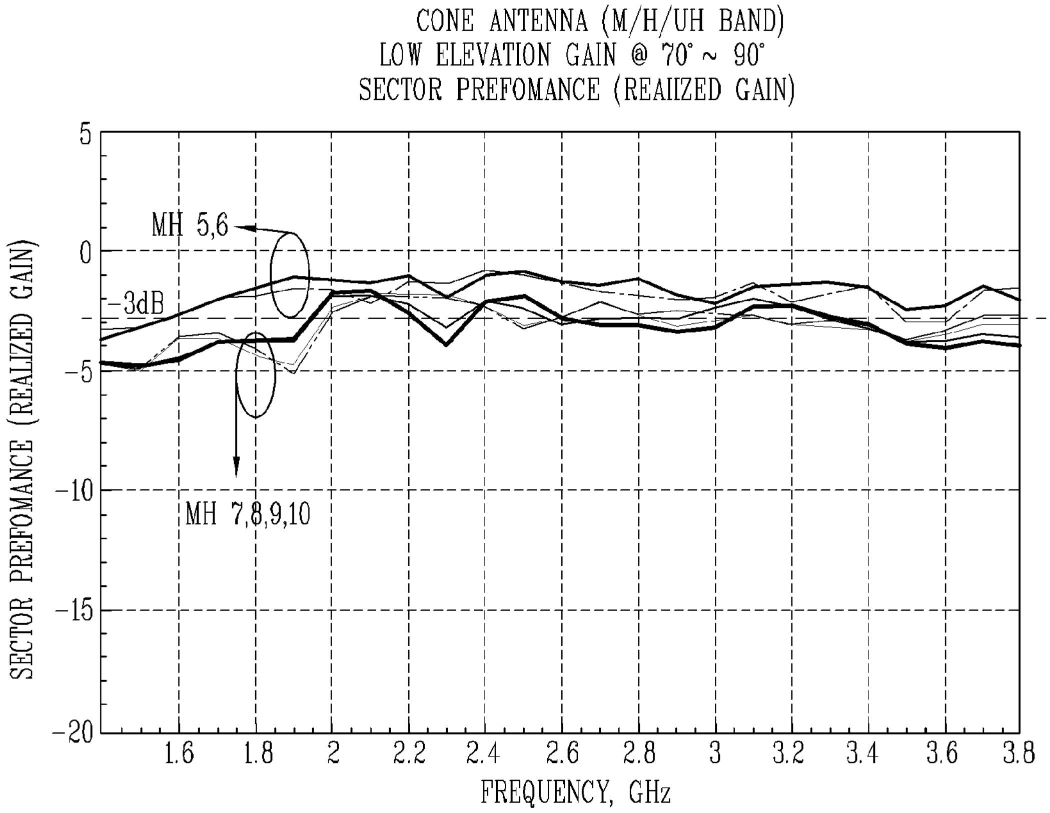
FIG. 10B is a view illustrating gain characteristics in a specific elevation range when a second type cone antenna according to the present disclosure is used in a low frequency band.

FIG. 10A is a view illustrating gain characteristics in a specific elevation range when an Inverted-F Antenna (IFA) is used in a low frequency band. On the other hand, FIG. 10B is a view illustrating gain characteristics in a specific elevation range when the second type cone antenna according to the present disclosure is used in a low frequency band. With respect to a specific elevation range, the vehicle may transmit and/or receive signals substantially in a horizontal direction rather than a bore-sight. Therefore, the specific elevation range may be set in a range of 70 degrees to 90 degrees based on the z-axis, that is, in a range substantially horizontal to the vehicle.

Referring to FIG. 10A, when IFA is used, even in the first frequency band (0.6 GHz to 1 GHz), which is a low frequency band, a gain value that is sufficient to allow signal reception in the elevation range of 70 degrees to 90 degrees can be obtained. On the other hand, when the second type cone antenna is used as illustrated in FIG. 10B, a gain that is close to −3 dB can be obtained in the elevation range of 70 degrees to 90 degrees in the second frequency band, which is an intermediate frequency band. In this regard, the cone antennas MH5 to MH10 each having a single shorting pin can obtain a high gain value even in a range substantially horizontal to the vehicle.

In FIG. 10B, some cone antennas MH7 to MH10 may have slightly lower gain values than other cone antennas MH5 and MH6 because they are disposed adjacent to each other as illustrated in FIGS. 5A and 5B. Meanwhile, isolation may be improved by adjusting an arrangement distance between the cone antennas MH7 to MH10 or rotating the cone antennas MH7 to MH10 by 90 degrees to 180 degrees with respect to each other. In this regard, a structure in which isolation is improved by rotating a cone antenna and optimally arranging a metal patch will be described with reference to FIG. 15A.

Figure 11:
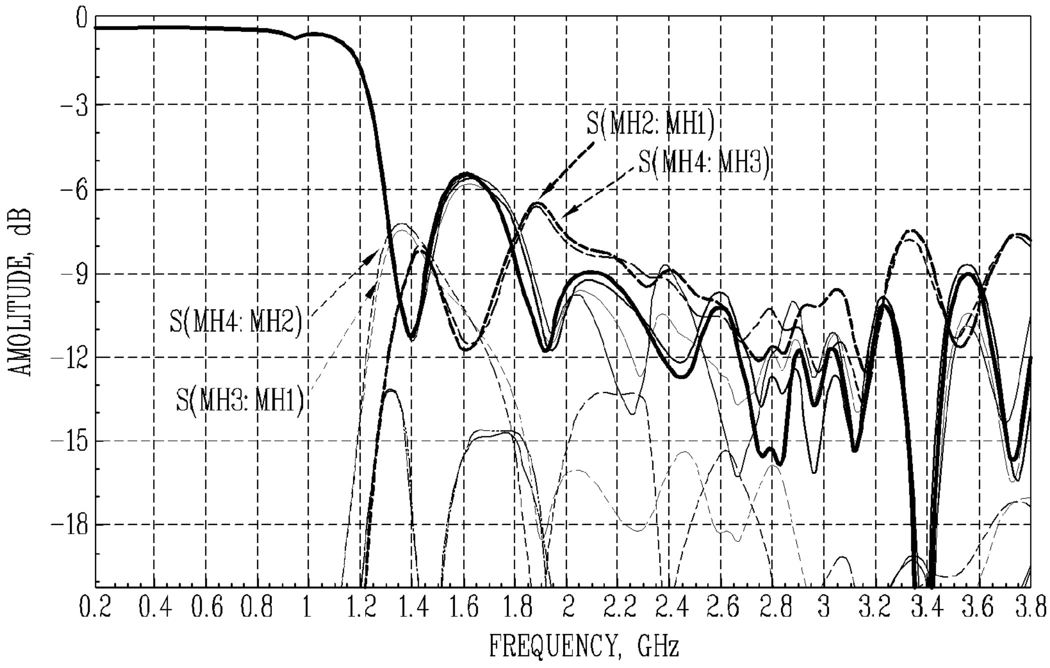
FIG. 11 is a view illustrating comparison results of isolation between a plurality of cone antennas.

FIG. 11 is a view illustrating comparison results of isolation among a plurality of cone antennas. Referring to FIGS. 5A to 6 and 11, an isolation value between the adjacent cone antennas MH1 to MH4 may be about −6.5 dB in a 1.4 GHz band and about −7 dB in a 2 GHz band. Accordingly, there is a need to improve the isolation between the adjacent cone antennas MH1 to MH4 in the horizontal and vertical directions.

Figure 12:
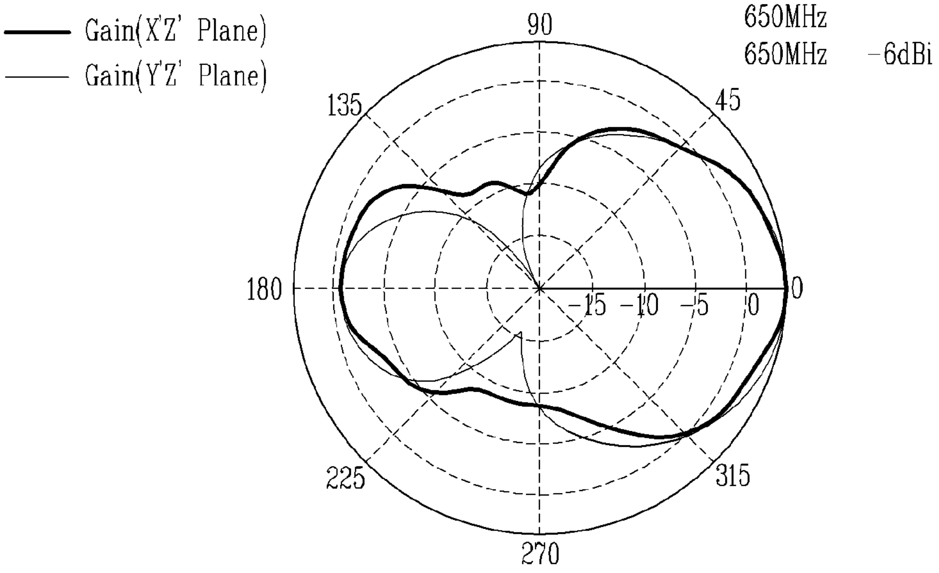
FIG. 12 is a view illustrating radiation pattern results of a low band (LB) antenna at different frequencies of an LB band.
Figure 12:
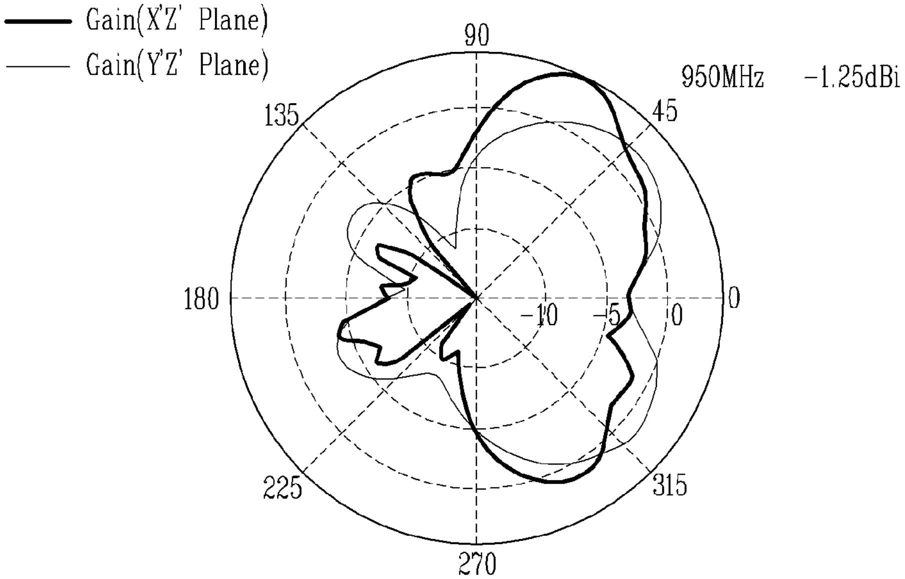
Figure 15A:
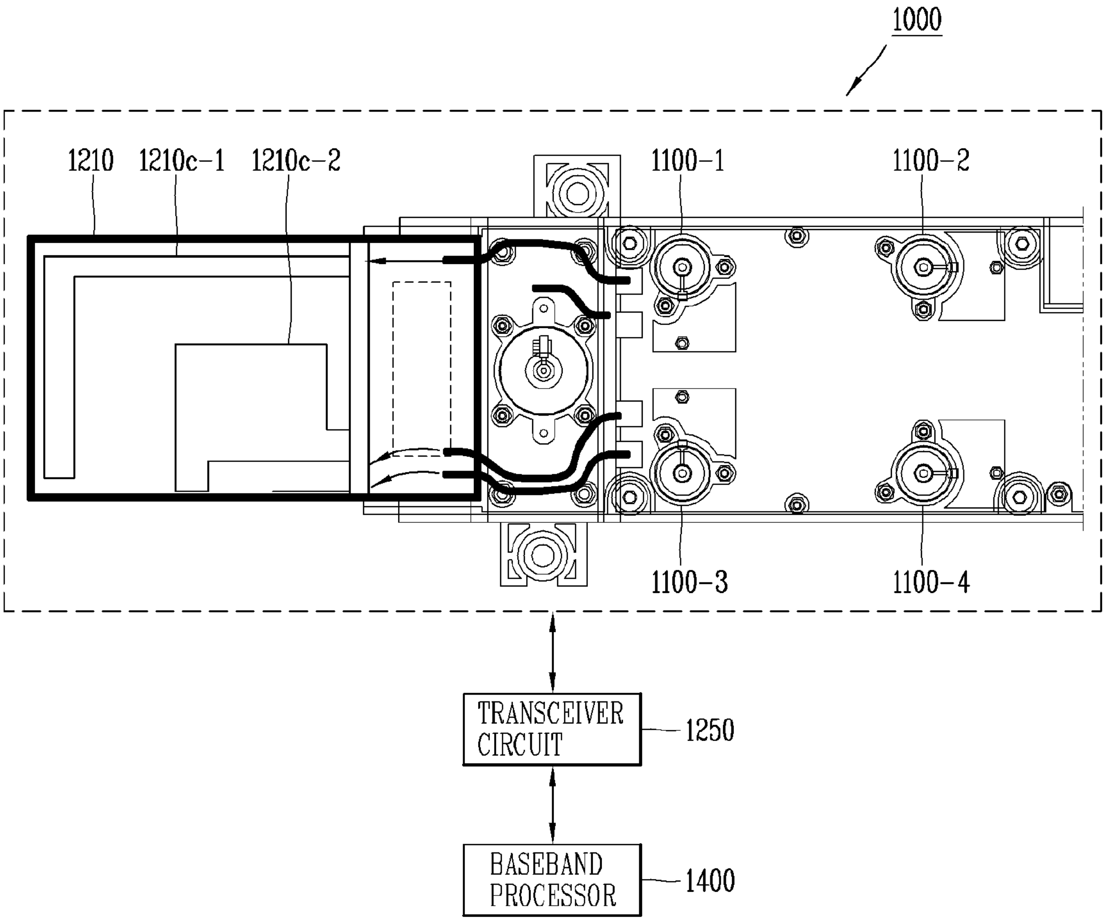
FIG. 15A is a view illustrating a configuration of cone antennas and LB antennas disposed in an antenna system according to another implementation.
Figure 15B:
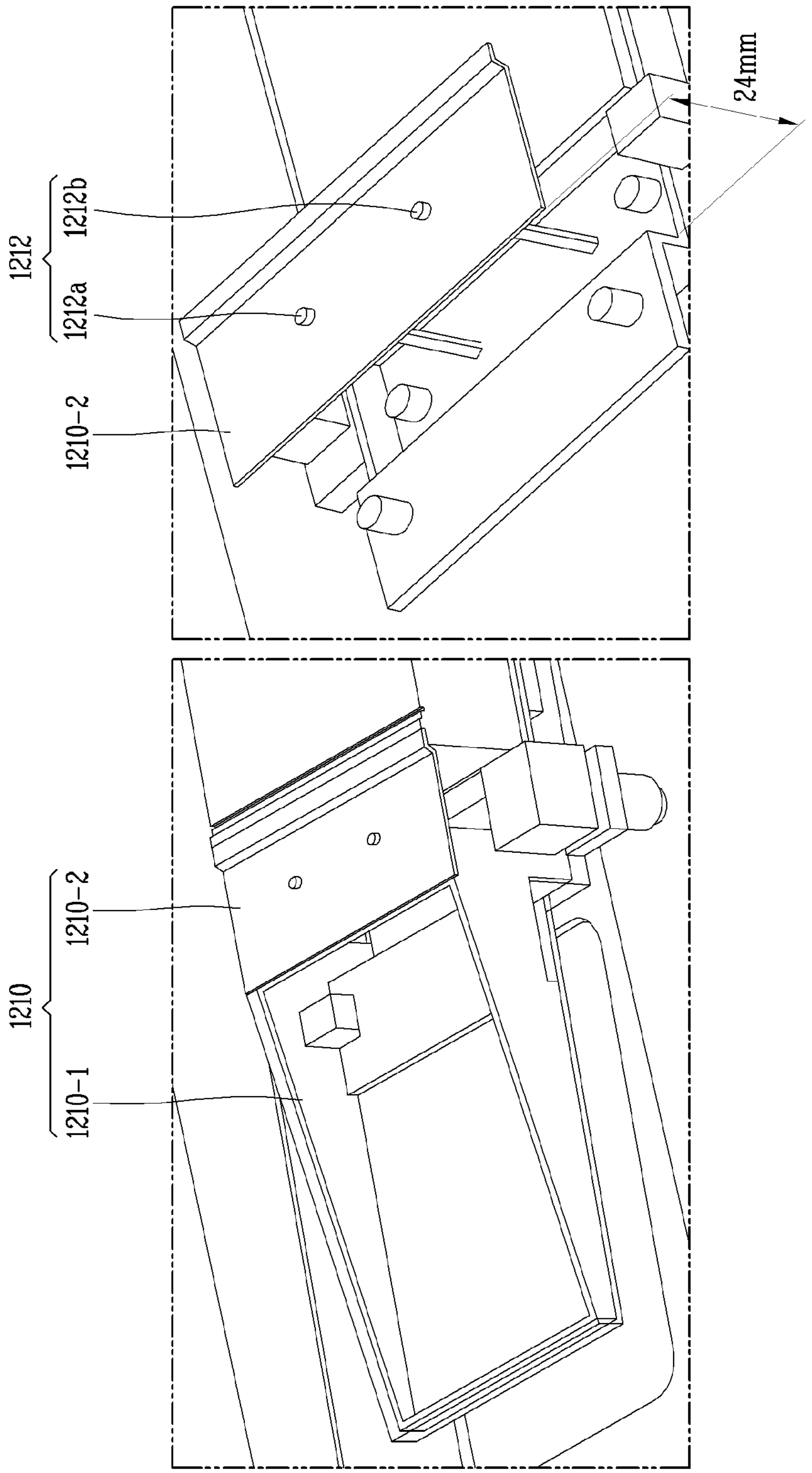
FIG. 15B is a perspective view illustrating the LB antennas disposed in the antenna system according to the another implementation.

FIG. 12 is a view illustrating radiation pattern results of an LB antenna at different frequencies of the low band LB. Here, the LB antenna may be a second type cone antenna LB for improving characteristics in the low band LB, but may not be limited thereto. In this regard, the LB antenna may be a patch antenna having a coupling feed structure as illustrated in FIGS. 15A and 15B.

(a) of FIG. 12 illustrates radiation patterns on an XY plane and a YZ plane at 650 MHz of the low band LB. At 650 MHz of the low band LB, a gain of about −6 dB may be obtained in a range of 70 to 90 degrees with respect to the z-axis, that is, in a substantially horizontal range.

On the other hand, (b) of FIG. 12 illustrates radiation patterns on the XY plane and the YZ plane at 900 MHz of the low band LB. At 900 MHz of the low band LB, a gain of about −1.25 dB may be obtained in a range of 70 to 90 degrees with respect to the z-axis, that is, in the substantially horizontal range. Accordingly, it can be seen that the cone antenna according to the present disclosure has improved reception capability in the substantially horizontal range at a predetermined frequency or higher in the low band LB.

Figure 13A:
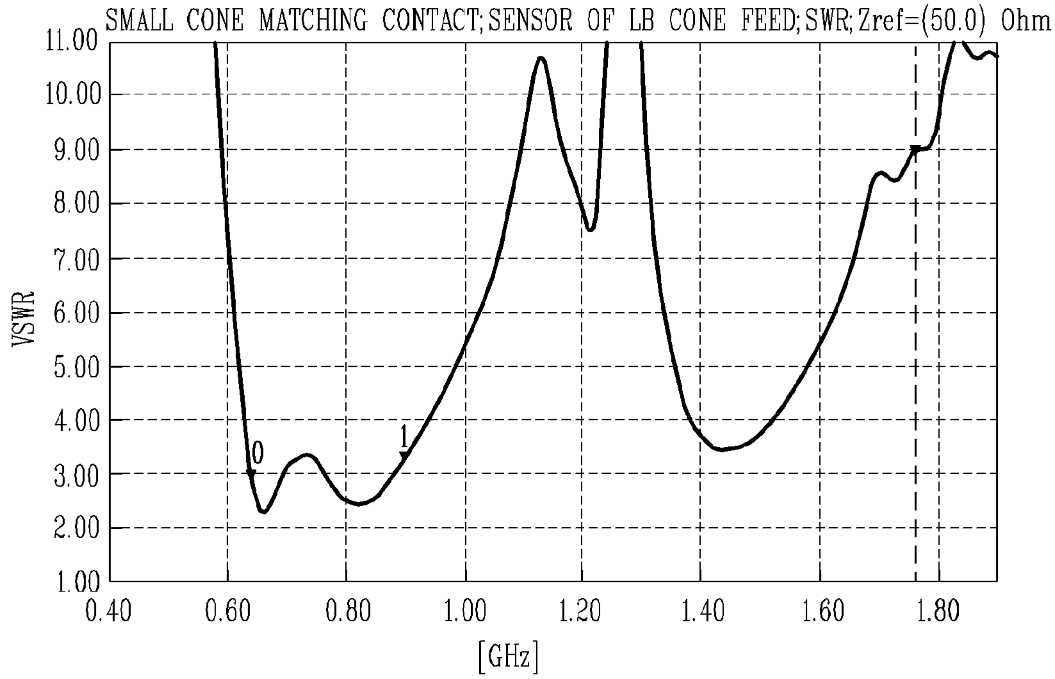
FIG. 13A is a view illustrating a voltage standing wave ratio (VSWR) of the LB antenna.
Figure 13B:
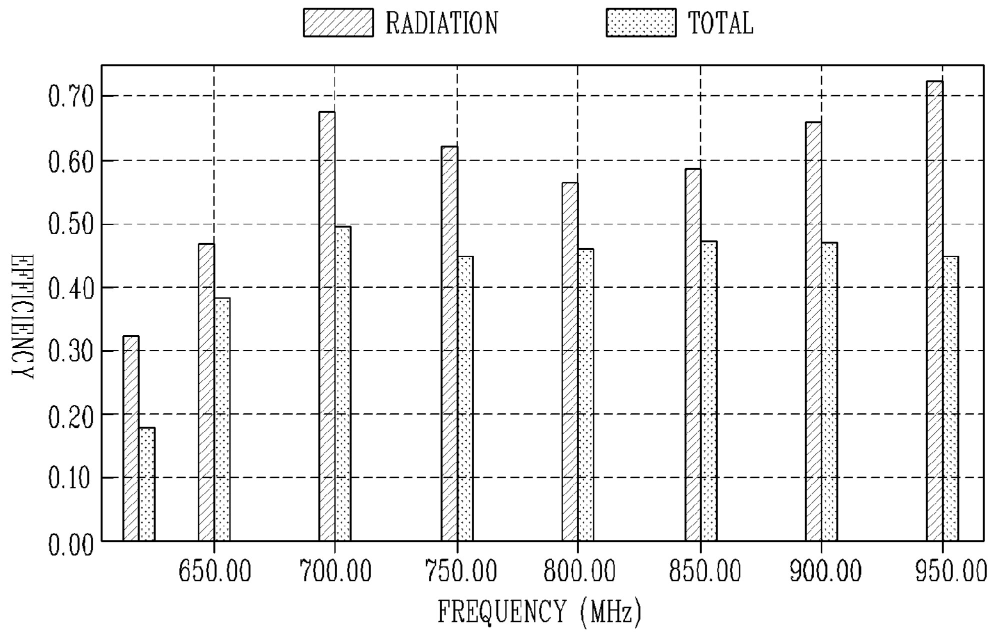
FIG. 13B is a view illustrating radiation efficiency and total efficiency of the LB antenna.

FIG. 13A is a view illustrating a voltage standing wave ratio (VSWR) of an LB antenna according to the present disclosure. FIG. 13B is a view illustrating radiation efficiency and total efficiency of the LB antenna.

Referring to FIG. 13A, since a VSWR value is 3 or less at 650 MHz to 900 MHz of the low band LB, it can be seen that the LB antenna operates normally. Meanwhile, referring to FIG. 13B, since the radiation efficiency of the LB antenna has a value of 45% or more in a band of 650 MHz or higher, it can be seen that the antenna operates normally according to such high antenna efficiency.

Here, total efficiency of the LB antenna may be a value obtained in consideration of radiation efficiency and loss due to VSWR. The total efficiency of the LB antenna may be about 40% at 650 MHz and have a value higher than that at other frequencies. Accordingly, it can be seen that the LB antenna operates normally in terms of return loss characteristics and radiation efficiency characteristics as an antenna.

Figure 14:
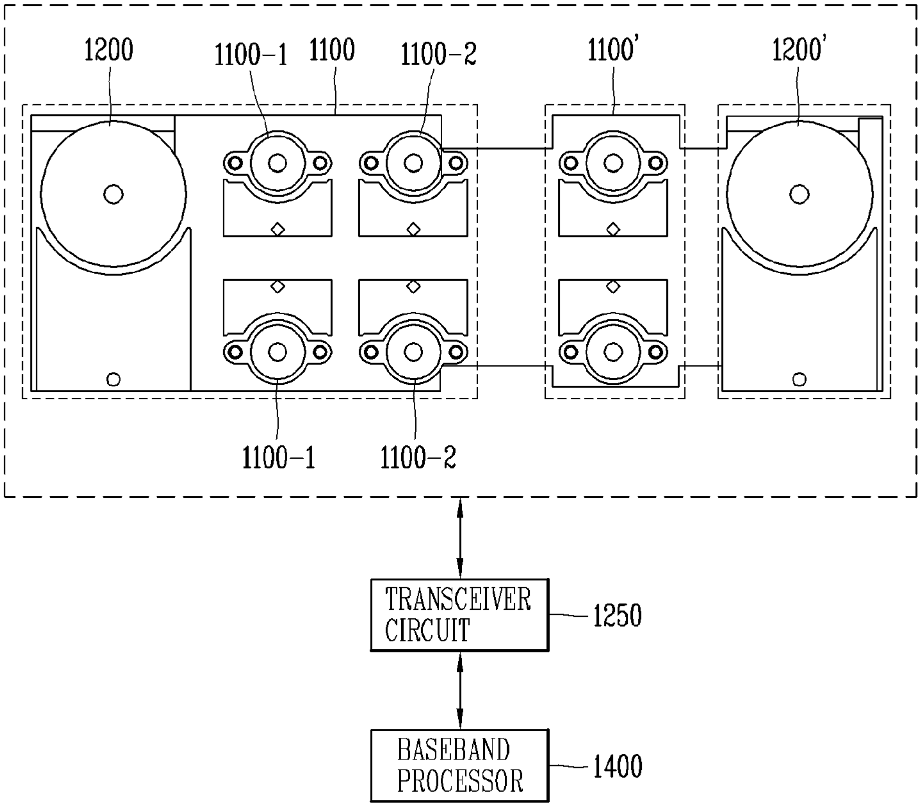
FIG. 14 is a view illustrating a configuration of an antenna system including a plurality of cone antennas, a transceiver circuit, and a processor in accordance with another aspect.

Hereinafter, an antenna system including a plurality of cone antennas, a transceiver circuit, and a baseband processor in accordance with another aspect will be described. FIG. 14 is a view illustrating one example of an antenna system including a plurality of cone antennas, a transceiver circuit, and a processor in accordance with another aspect.

Referring to FIGS. 2A to 14, the antenna system 1000 may include a conical array antenna 1100-1, 1100-2, 1100' having an upper portion connected to the first substrate S1 and a lower portion connected to the second substrate S2, and provided with cone radiators each having an upper aperture and arranged at predetermined distances. The antenna system 1000 may further include a patch array radiator 1101 disposed on the first substrate S1 and having metal patches disposed with being spaced apart from the upper aperture. The antenna system 1000 may further include shorting pins 1102 disposed to electrically connect the metal patches and the ground layer GND of the second substrate S2. The antenna system 1000 may further include a feeder 1105 disposed on the second substrate and configured to transmit a signal to each cone radiator through a lower aperture of the cone radiator of the conical array antenna.

In this regard, the shorting pin 1105 may be provided by one for each cone radiator so as to connect each of the metal patches and the ground layer GND.

The conical array antenna 1100 may have 2×2 conical array antennas MH1 to MH4 disposed at predetermined distances in the horizontal direction and the vertical direction. Also, the antenna system 1000 may further include a transceiver circuit 1250 configured to perform MIMO in the first frequency band through the 2×2 conical array antennas MH1 to MH4. Here, the first frequency band may be a band including the middle band MB and the high band HB.

On the other hand, the antenna system 1000 may further include a second type cone antenna 1200, 1200' spaced apart from the conical array antenna 1100 by a predetermined distance, and configured to operate in a second frequency band lower than the frequency band of the conical array antenna 1100.

The antenna system 1000 may further include a baseband processor 1400 connected to the transceiver circuit 1250 to control the operation of the transceiver circuit 1250. The baseband processor 1400 may perform MIMO or a diversity operation in the middle band MB and the high band HB as the first frequency band through the plurality of cone antennas MH1 to MH 6. In detail, the baseband processor 1400 may perform MIMO or the diversity operation through the 2×2 conical array antennas MH1 to MH4 and the second conical array antennas MH5 and MH6, which are spaced apart from the 2×2 conical array antennas MH1 to MH4.

Also, the baseband processor 1400 may perform the MIMO or diversity operation in the low band LB as the second frequency band through the plurality of LB antennas LB1 to LB4. Specifically, the baseband processor 1400 may perform the MIMO or diversity operation through the second type cone antennas 1200 and 1200', which are disposed at the left and right sides of the 2×2 conical array antennas MH1 to MH4, in the second frequency band.

On the other hand, the cone antennas that are disposed in the antenna system mounted on the vehicle may be arranged in an optimal structure for improving isolation from each other. Also, the LB antennas that are disposed in the antenna system mounted on the vehicle may be arranged in an optimal structure for a broadband operation.

FIG. 15A is a view illustrating a configuration of cone antennas and LB antennas disposed in an antenna system according to another implementation. FIG. 15B is a perspective view illustrating the LB antennas disposed in the antenna system according to the another implementation.

Referring to FIGS. 15A and 15B, the 2×2 conical array antennas 1101-1 to 1101-4 may be disposed in a rotated state by predetermined angles with respect to one another. Specifically, the second cone antenna 1101-2 may be arranged by being rotated by a predetermined angle to optimize isolation from the first cone antenna 1101-1. The second cone antenna 1101-2 may be arranged by being rotated by an angle between 90 and 180 degrees with respect to the first cone antenna 1101-1. As an example, the second cone antenna 1101-2 may be disposed by being rotated by an angle of 135 degrees with respect to the first cone antenna 1101-1.

The third cone antenna 1101-3 may be arranged by being rotated by a predetermined angle to optimize isolation from the first cone antenna 1101-1. The third cone antenna 1101-3 may be arranged by being rotated by an angle of 180 degrees with respect to the first cone antenna 1101-1, namely, arranged in a symmetric form.

The fourth cone antenna 1101-4 may be arranged by being rotated by a predetermined angle to optimize isolation from the second cone antenna 1101-2. Specifically, the fourth cone antenna 1101-4 may be arranged by being rotated by an angle of 180 degrees with respect to the second cone antenna 1101-2, namely, arranged in a symmetric form.

In this case, each of the metal patches disposed adjacent to the first to fourth cone antennas 1101-1 to 1101-4 may be disposed only on a partial region at one side of the cone antenna. In this regard, the metal patch disposed only at the partial region may be a cut rectangular patch disposed only at a region between the adjacent outer rims 1103. Such cut rectangular patches can reduce the level of interference between the adjacent cone antennas.

On the other hand, the LB antenna 1210 may be configured to radiate a signal, which is coupled through a plurality of coupling elements 1210*c*-1 and 1201*c*-2, in the low band LB as the second frequency band. In this regard, a Wi-Fi antenna may be disposed adjacent to the coupling element 1201*c*-2. Since the Wi-Fi antenna operates in a band higher than the LB band, it may have a shorter length than the coupling element 1201*c*-2. The Wi-Fi antenna may operate as an antenna independently without coupling with the LB antenna 1210.

On the other hand, the LB antenna 1210 may include a first patch antenna 1210-1 disposed at a predetermined inclination and a second patch antenna 1210-2 connected to the first patch antenna 1210-1. The plurality of coupling elements 1210*c*-1 and 1201*c*-2 may be arranged such that signals of the LB band are coupled through the first patch antenna 1210-1. Accordingly, the signal of the LB band can be radiated to the first patch antenna 1210-1 and the second patch antenna 1210-2 through the plurality of coupling elements 1210*c*-1 and 1201*c*-2.

Meanwhile, according to a modified implementation, the LB band signal may be radiated only through the plurality of coupling elements 1210*c*-1 and 1201*c*-2 and the second patch antenna 1210-2 without the first patch antenna 1210-1. Accordingly, the LB antenna 1210 may include only the coupling elements 1210*c*-1 and 1201*c*-2 or may include the coupling elements 1210*c*-1 and 1201*c*-2 and the second patch antenna 1210-2. Alternatively, the LB antenna 1210 may include only the second patch antenna 1210-2.

The second patch antenna 1210-2 may be connected to the ground layer GND through one or more shorting pins 1212*a* and 1212*b*, so as to reduce an antenna size and improve a horizontal radiation pattern.

The foregoing description has been given of the vehicle and antenna system having the cone antennas according to the present disclosure. Technical effects of the vehicle and antenna system having the cone antennas will be described as follows.

According to the present disclosure, hollow cone antennas can be disposed in a vehicle so as to reduce a weight of an antenna system mounted on the vehicle.

According to the present disclosure, the cone antenna can be connected to a metal patch adjacent thereto by a single shorting pin, thereby improving a signal reception performance in almost all directions.

According to the present disclosure, the antenna system can be optimized with different antennas in a low band LB and other bands. This can result in arranging the antenna system with optimal configuration and performance on a roof frame of the vehicle.

According to the present disclosure, the antenna system of the vehicle can implement MIMO and a diversity operation using a plurality of antennas in specific bands.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

In relation to the aforementioned present disclosure, design and operations of a plurality of cone antennas and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A vehicle having antennas, the vehicle comprising:

a first substrate;

a second substrate spaced apart from the first substrate by a predetermined distance and having a ground layer;

a conical array antenna having cone radiators comprising a first cone radiator and a second cone radiator and arranged at predetermined distances, the cone radiators being disposed between the first substrate and the second substrate, having upper portions connected to the first substrate and lower portions connected to the second substrate, and provided with upper apertures, respectively;

a patch array radiator disposed on the first substrate and having metal patches disposed with being spaced apart from the upper apertures;

shorting pins configured to electrically connect the metal patches and a ground layer of the second substrate; and a transceiver circuit configured to control a signal to be radiated through at least one of the conical array antennas, wherein the metal patches comprise:

a first metal patch spaced apart from one side of the upper aperture of the first cone radiator; and a second metal patch spaced apart from another side of the upper aperture of the second cone radiator, wherein the first metal patch and the second metal patch are disposed between the first cone radiator and the second cone radiator, and wherein an outer side of the first metal patch is spaced apart from an outer side of the second metal patch.

2. The vehicle of claim 1, wherein the conical array antenna is configured as 2×2 conical array antennas spaced apart from each other in a horizontal direction and a vertical direction, wherein the transceiver circuit performs Multi-input/Multi-output (MIMO) in a first frequency band through the 2×2 conical array antennas, wherein the 2×2 conical array antennas comprise first to fourth cone radiators, and wherein the patch array radiator comprises 2×2 metal patches spaced apart from upper apertures of the first to fourth cone radiators.

3. The vehicle of claim 1, further comprising a second type cone antenna arranged to be spaced apart from the conical array antenna by a predetermined distance and configured to operate in a second frequency band lower than a frequency band of the conical array antenna.

4. The vehicle of claim 3, wherein the second type cone antenna comprises:

a second type cone radiator disposed between the first substrate and the second substrate, and having an upper portion connected to the first substrate and a lower portion connected to the second substrate, the second type cone radiator having a second upper aperture; and a third metal patch disposed to be spaced apart from the second upper aperture.

5. The vehicle of claim 3, wherein the second type cone antenna comprises:

a second type cone radiator disposed between a third substrate and a fourth substrate spaced apart from the third substrate by a predetermined distance, and having an upper portion connected to the third substrate and a lower portion connected to the fourth substrate, the second type cone radiator having a second upper aperture; and a third metal patch disposed to be spaced apart from the second upper aperture.

6. The vehicle of claim 3, wherein the second type cone antenna is configured as 2×2 array antennas by 1×2 array antennas disposed at one side of the conical array antenna and 1×2 array antennas disposed at another side of the conical array antenna, and wherein a distance between the 1×2 array antennas disposed at the one side and the 1×2 array antennas disposed at the another side is longer than a distance between the conical array antennas.

7. The vehicle of claim 6, wherein the transceiver circuit performs MIMO in a first frequency band through the conical array antennas, and performs MIMO in a second frequency band lower than the first frequency band through the second type cone antenna.

8. The vehicle of claim 6, further comprising a second conical array antenna disposed between the conical array antenna and the 1×2 array antennas disposed at the another side, and configured to operate in a first frequency band.

9. The vehicle of claim 8, wherein the transceiver circuit performs MIMO in the first frequency band through at least one of the conical array antennas and at least one of the second conical array antennas.

10. The vehicle of claim 8, wherein the second type cone antenna comprises:

a first antenna module including first and second cone antennas disposed vertically at the one side of the conical array antenna; and a second antenna module including third and fourth cone antennas disposed vertically at another side of the second conical array antenna, and wherein the second type cone antenna operates in the second frequency band that is lower than the first frequency band.

11. The vehicle of claim 10, wherein the transceiver circuit performs MIMO through one of the first or second cone antennas and one of the third or fourth cone antennas.

12. The vehicle of claim 1, further comprising feeders disposed on the second substrate and configured to transmit signals to the cone radiators, respectively, through lower apertures of the cone radiators of the conical array antenna.

13. The vehicle of claim 10, wherein the first and second antenna modules comprise remote keyless entry (RKE) antennas therein, and wherein the first and second antenna modules comprise antennas operating in Bluetooth and Wi-Fi bands.

14. The vehicle of claim 8, further comprising a Digital Satellite Dual Antenna (DSDA) disposed between the conical array antenna and the second conical array antenna and configured to receive a satellite signal.

15. The vehicle of claim 1, wherein the shorting pins comprise:

a first shorting pin disposed adjacent to the outer side of the first metal patch to connect the first metal patch and the ground layer; and a second shorting pin disposed adjacent to the outer side of the second metal patch to connect the second metal patch and the ground layer.

16. An antenna system mounted on a vehicle, the antenna system comprising:

a conical array antenna including cone radiators comprising a first cone radiator and a second cone radiator and arranged at predetermined distances, the cone radiators being disposed between a first substrate and a second substrate, having upper portions connected to the first substrate and lower portions connected to the second substrate, and provided with upper apertures;

a patch array radiator disposed on the first substrate and having metal patches disposed with being spaced apart from the upper apertures;

shorting pins configured to electrically connect the metal patches and a ground layer of the second substrate; and feeders disposed on the second substrate and configured to transmit signals to the cone radiators, respectively, through lower apertures of the cone radiators of the conical array antenna, wherein the metal patches comprise:

a first metal patch spaced apart from one side of the upper aperture of the first cone radiator; and a second metal patch spaced apart from another side of the upper aperture of the second cone radiator, wherein the first metal patch and the second metal patch are disposed between the first cone radiator and the second cone radiator, and wherein an outer side of the first metal patch is spaced apart from an outer side of the second metal patch.

17. The antenna system of claim 16, wherein the shorting pins comprise:

a first shorting pin disposed adjacent to the outer side of the first metal patch to connect the first metal patch and the ground layer; and a second shorting pin disposed adjacent to the outer side of the second metal patch to connect the second metal patch and the ground layer.

18. The antenna system of claim 16, wherein the conical array antenna is configured as 2×2 conical array antennas spaced apart from each other by predetermined distances in horizontal and vertical directions, and wherein the antenna system further comprises a transceiver circuit configured to perform MIMO in a first frequency band through the 2×2 conical array antennas.

19. The antenna system of claim 16, further comprising a second type cone antenna arranged to be spaced apart from the conical array antenna by a predetermined distance and configured to operate in a second frequency band lower than a frequency band of the conical array antenna.

20. The antenna system of claim 19, further comprising a baseband processor connected to the transceiver circuit and configured to control the transceiver circuit, wherein the baseband processor performs MIMO or a diversity operation through the 2×2 conical array antennas and a second conical array antenna spaced apart from the 2×2 conical array antennas in the first frequency band, and performs the MIMO and the diversity operation through second type cone antennas disposed at left and right sides of the 2×2 conical array antennas in a second frequency band lower than the first frequency band.

* * * * *